(12) United States Patent
O'Brien et al.

(10) Patent No.: US 8,296,526 B2
(45) Date of Patent: Oct. 23, 2012

(54) SHARED MEMORY HAVING MULTIPLE ACCESS CONFIGURATIONS

(75) Inventors: Kari Ann O'Brien, Austin, TX (US); George Lattimore, Austin, TX (US); Joern Soersensen, Aars (DK); Matthew B Rutledge, Austin, TX (US); Paul William Hollis, Austin, TX (US)

(73) Assignee: MediaTek, Inc., Hsin-Chu (TW)

( * ) Notice: Subject to any disclaimer, the term of this patent is extended or adjusted under 35 U.S.C. 154(b) by 694 days.

(21) Appl. No.: 12/486,308

(22) Filed: Jun. 17, 2009

(65) Prior Publication Data

US 2010/0325368 A1 Dec. 23, 2010

(51) Int. Cl.
*G06F 12/00* (2006.01)
*G06F 13/00* (2006.01)
*G06F 13/28* (2006.01)

(52) U.S. Cl. .. 711/147; 711/167; 711/170; 711/E12.002
(58) Field of Classification Search ................ 711/147, 711/167, 170, E12.002
See application file for complete search history.

(56) References Cited

U.S. PATENT DOCUMENTS

| | | | |
|---|---|---|---|
| 6,401,176 B1 * | 6/2002 | Fadavi-Ardekani et al. | 711/151 |
| 6,965,974 B1 * | 11/2005 | Bays et al. | 711/153 |
| 7,352,836 B1 * | 4/2008 | Mendenhall | 375/372 |
| 7,555,585 B2 * | 6/2009 | Gupta et al. | 710/241 |
| 2004/0019748 A1 | 1/2004 | Lee | 711/149 |
| 2005/0254276 A1 * | 11/2005 | Beit-Grogger et al. | 365/15 |

FOREIGN PATENT DOCUMENTS

WO WO 03/036451 5/2003

OTHER PUBLICATIONS

"Office Action", Chinese Application No. 200910226253.X , 9 pages, Nov. 30, 2011.
European Search Report, European Application No. EP 09175345.9, 3 pages , Jun. 23, 2010.

* cited by examiner

*Primary Examiner* — Sheng-Jen Tsai
(74) *Attorney, Agent, or Firm* — Fish & Richardson P.C.

(57) ABSTRACT

An apparatus includes a first processor that accesses memory according to a first clock frequency, a second processor that accesses memory according to a second clock frequency, and a memory device is configurable to selectively operate according to the first clock frequency or the second clock frequency. A memory controller enables dynamic configuration of organization of the memory device to allow a first portion of the memory device to be accessed by the first processor according to the first clock frequency and a second portion of the memory device to be accessed by the second processor according to the second clock frequency.

35 Claims, 15 Drawing Sheets

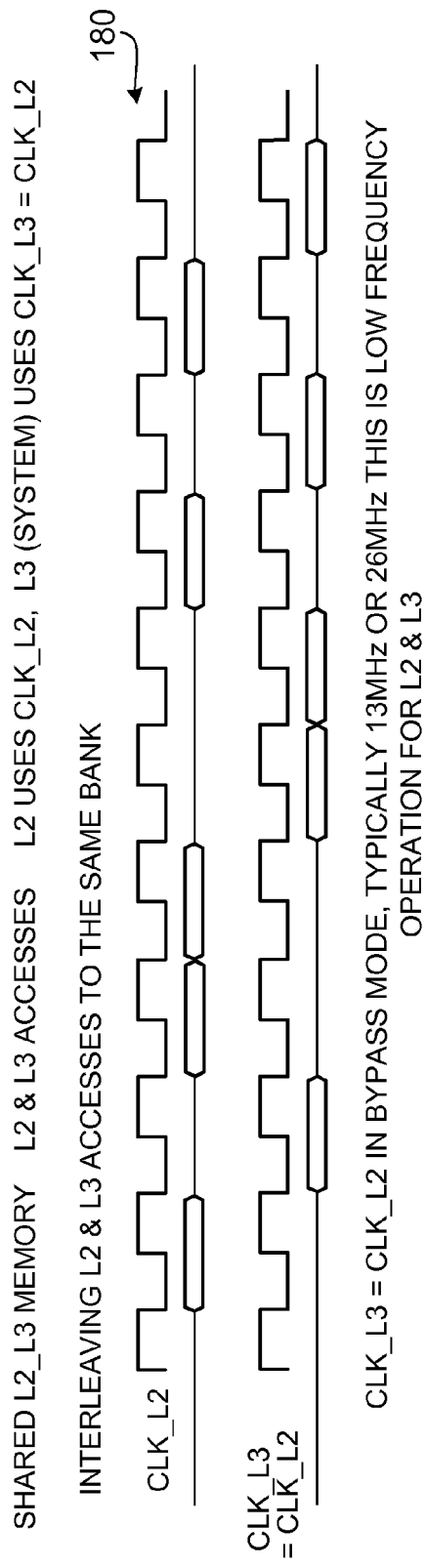
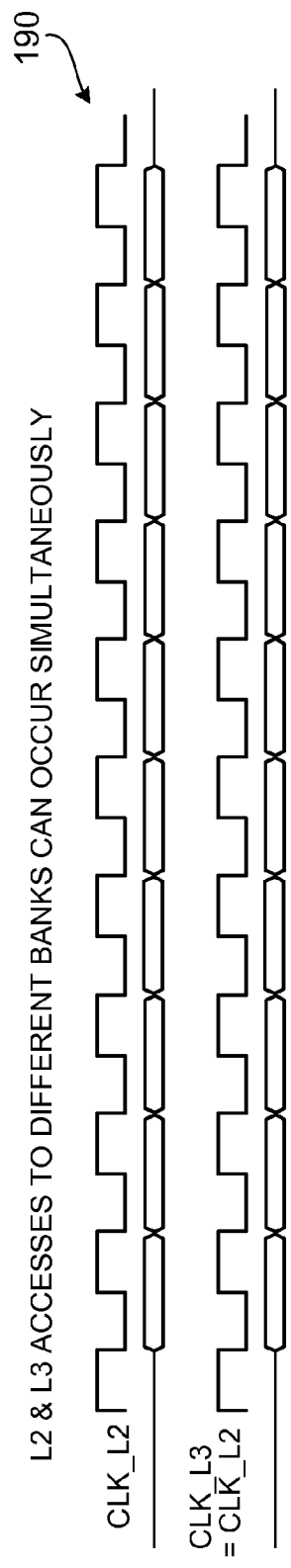
FIG. 9
FIG. 10

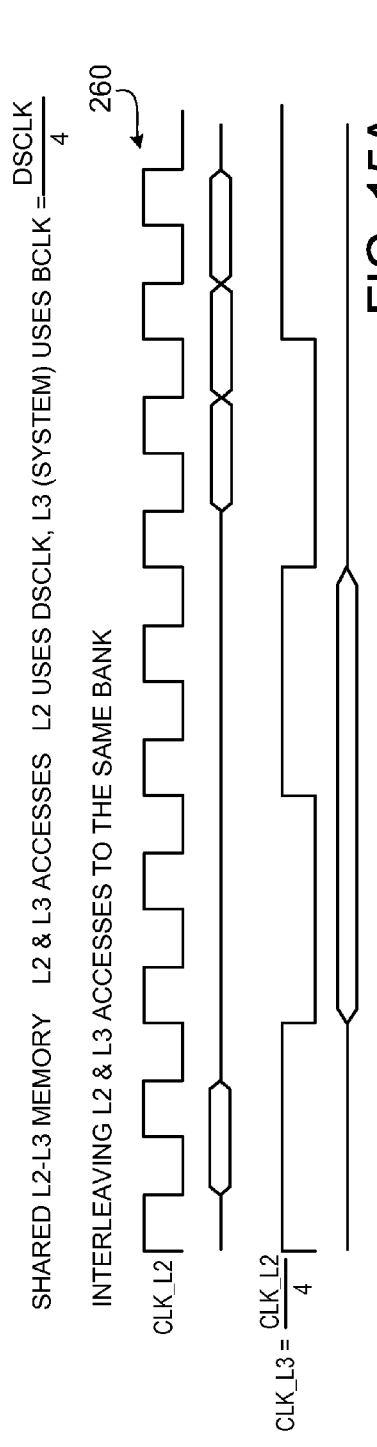
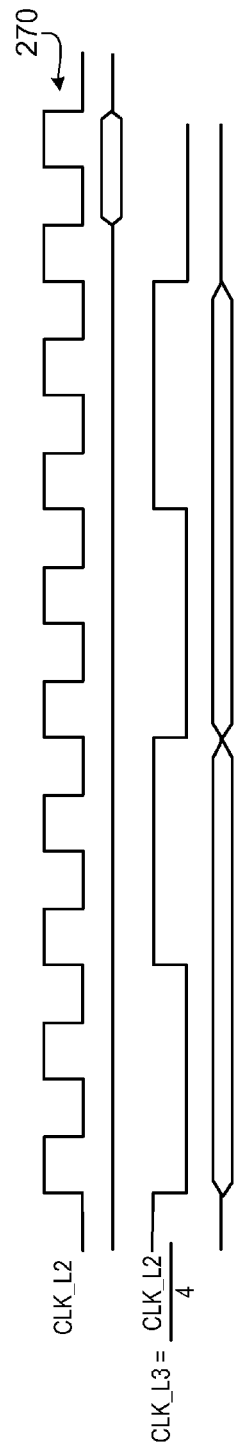
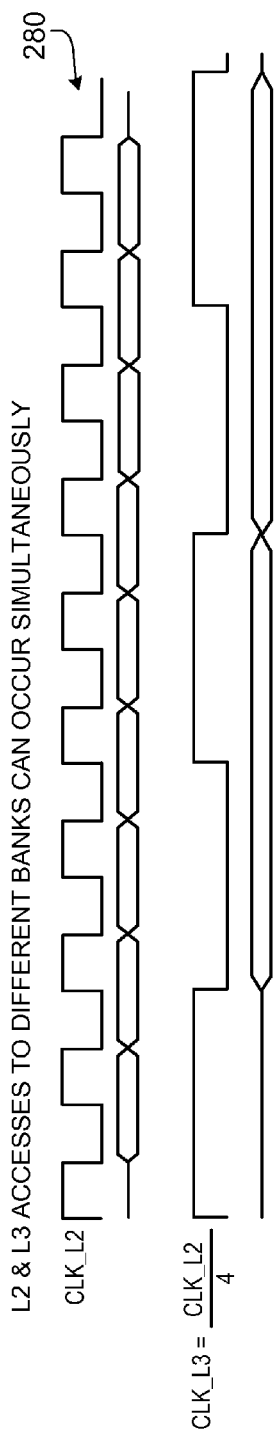

SHARED MEMORY HAVING MULTIPLE ACCESS CONFIGURATIONS

BACKGROUND

This description relates to shared memory having multiple access configurations.

A system on a chip (SoC) can have multiple embedded processors in which each processor may have unique memory access timing and data bus width requirements for accessing memory. In one implementation, two embedded processors each access a separate embedded memory module according to its native access timing scheme. In another implementation, two processors having different memory access timing schemes can access a shared memory device using a bridging process. For example, suppose a first processor is designed to access memory according to a first clock frequency, a second processor is designed to access memory according to a second clock frequency, and the shared memory module is configured to be accessed according to the first clock frequency. The first processor can access the memory according to its native memory access timing scheme. The second processor can access the memory module using a bridging process in which requests are converted from the second clock domain to the first clock domain that is compatible with the memory module, and responses from the memory module are converted from the first clock domain back to the second clock domain that is compatible with the second processor.

SUMMARY

In general, in one aspect, an apparatus includes a first processor that accesses memory according to a first clock frequency; a second processor that accesses memory according to a second clock frequency; a memory device configurable to selectively operate according to the first clock frequency or the second clock frequency; and a memory controller to enable dynamic configuration of organization of the memory device to allow a first portion of the memory device to be accessed by the first processor according to the first clock frequency and a second portion of the memory device to be accessed by the second processor according to the second clock frequency.

Implementations may include one or more of the following features. The memory controller may enable re-configuration of the organization of the memory device to adjust the sizes of the first and second portions while the first processor is executing an application program. The memory controller may enable re-configuration of the organization of the memory device to adjust the sizes of the first and second portions upon start-up of the memory device and the memory controller. The memory device may include a plurality of memory banks and the memory controller may allocate the first and second portions of the memory device along boundaries of memory banks. Multiplexers may be provided, in which each multiplexer is associated with a memory bank, and each multiplexer selects from a first clock signal having the first clock frequency and a second clock signal having the second clock frequency and passing the selected clock signal to the corresponding memory bank. The memory controller may enable dynamic configuration of the organization of the memory device to allow a third portion of the memory device to be accessed exclusively by the first processor according to the first clock frequency.

The memory controller may enable re-configuration of the memory device to adjust the sizes of the first and second portions, and the memory controller may include an address decoder to receive memory access requests from the first processor and determine whether the memory access requests are for accessing the first or third portion of the memory device. The memory controller may reconfigure the organization of the memory device to re-allocate the sizes of the first and second portions of the memory device using five or less clock cycles according to the slower of the first and second clock frequencies. The first portion of the memory device may be accessed using a first bus width, and the second portion of the memory device may be accessed using a second bus width. The memory controller may monitor execution of memory access instructions, and upon receiving a signal to switch from a first memory access clock frequency to a second memory access clock frequency for accessing a segment of the memory device, determine whether a previous memory access instruction using the first memory access clock frequency for the segment of the memory device has been completed before switching to the second memory access clock frequency.

The memory controller can include an arbitration unit to arbitrate accesses to shared memory banks of the memory by the first and second processors. The memory controller can include a first clock domain requester that operates according to the first clock frequency and passes memory access instructions from the first processor to the shared memory banks, and a second clock domain requestor that operates according to the second clock frequency and passes memory access instructions from the second processor to the shared memory banks. Only one of the first and second clock domain requesters is granted access to any particular shared memory bank at a given time. The first clock domain requester can be granted access to a particular shared memory bank until the second clock domain requester requests access to the particular shared memory bank, upon which the first and second clock domain requesters can perform an arbitration process to determine whether the second clock domain requestor can be granted access to the particular shared memory bank. The second clock domain requester can send an arbitration request signal to the first clock domain requester, and the first clock domain requester can send an arbitration grant signal to the second clock domain requester after the first clock domain requester determines that memory access requests from the first processor to the particular shared memory bank have been completed. The memory controller can include one or more synchronization units that synchronize the arbitration request signal and arbitration grant signal across different clock domains. The memory device may be configurable to selectively operate according to three or more clock frequencies, and the memory controller may enable dynamic configuration of the memory device to allow a portion of the memory device to be accessed according to any of the clock frequencies in which the memory device is operable.

In general, in another aspect, an apparatus includes a first processor that accesses memory according to a first timing scheme; a second processor that accesses memory according to a second timing scheme; a memory device having shared memory banks that can be accessed by either the first or second processors, the shared memory banks configurable to selectively operate according to the first timing scheme or the second timing scheme; and a memory controller to enable dynamic configuration of organization of the shared memory banks to allow a first set of shared memory banks to be accessed by the first processor according to the first timing scheme and a second set of the shared memory banks to be accessed by the second processor according to the second timing scheme.

Implementations can include one or more of the following features. The first processor can access the shared memory banks according to a first clock frequency, and the second processor can access the shared memory banks according to a second clock frequency. The memory controller can include a first clock domain requester that operates according to the first clock frequency and passes memory access instructions from the first processor to the shared memory banks, and a second clock domain requester that operates according to the second clock frequency and passes memory access instructions from the second processor to the shared memory banks. Only one of the first and second clock domain requestors is granted access to any particular shared memory bank at a given time. When the first processor is granted access to a particular shared memory bank, and the second processor seeks access to the particular shared memory bank, the second clock domain requestor sends an arbitration request signal to the first clock domain requester, and the first clock domain requester sends an arbitration grant signal to the second clock domain requester after the first clock domain requester determines that memory access requests from the first processor to the particular shared memory bank have been completed. The memory controller can include one or more synchronization units that synchronize the arbitration request signal and arbitration grant signal across different clock domains.

In general, in another aspect, a method includes dynamically configuring organization of a memory device to allow a first portion of the memory device to be accessed by a first processor according to a first timing scheme and a second portion of the memory device to be accessed by a second processor according to a second timing scheme. A first memory access instruction is received from the first processor, and the first portion of the memory device is accessed responsive to the first memory access instruction according to the first timing scheme. A second memory access instruction is received from the second processor, and the second portion of the memory device is accessed responsive to the second memory access instruction according to the second timing scheme.

Implementations may include one or more of the following features. Accessing the first portion of the memory device according to the first timing scheme may include accessing the first portion of the memory device according to a first clock frequency, and accessing the second portion of the memory device according to the second timing scheme may include accessing the second portion of the memory device according to a second clock frequency. The method may include, for each memory bank in the memory device, selecting one of a first clock signal having the first clock frequency and a second clock signal having the second clock frequency, and passing the selected clock signal to the memory bank. The method may include reconfiguring the organization of the memory device to adjust the sizes of the first and second portions while executing an application program by the first processor. The method may include reconfiguring the organization of the memory device to adjust the sizes of the first and second portions upon start-up of the memory device and the memory controller. The method may include allocating the first and second portions of the memory device along boundaries of memory banks of the memory device. The method may include reconfiguring the memory device to re-allocate the sizes of the first and second portions of the memory device using five or less clock cycles according to the slower of the first and second clock frequencies. The method may include accessing the first portion of the memory device using a first bus width, and accessing the second portion of the memory device using a second bus width. The memory controller may monitor execution of memory access instructions, and upon receiving a signal to switch from a first memory access timing scheme to a second memory access timing scheme, determine whether memory access instructions associated with the first memory access timing scheme have been completed before switching to the second memory access timing scheme.

In general, in another aspect, a method includes dynamically configuring organization of a memory device having shared memory banks that are shared between a first processor and a second processor to allow a first set of the shared memory banks to be accessed by the first processor according to a first clock frequency and a second set of the shared memory banks to be accessed by the second processor according to a second clock frequency; and arbitrating requests for accessing the shared memory banks by the first and second processors, the requests from the first processor being synchronized according to the first clock frequency and the requests from the second processor being synchronized according to the second clock frequency.

Implementations can include one or more of the following features. The method can include granting access to a particular shared memory bank to the first processor until the second processor requests access to the particular shared memory bank, and performing an arbitration handshake to determine whether the second processor is granted access to the particular shared memory bank. Performing the arbitration handshake can include sending an arbitration request signal from a second clock domain requester to a first clock domain requester, and sending an arbitration grant signal from the first clock domain requester to the second clock domain requester after the first clock domain requester determines that memory access requests from the first processor to the particular shared memory bank have been completed. The method can include granting access to the particular shared memory bank to the second processor until the first processor requests access to the particular shared memory bank, sending an arbitration request signal from the first clock domain requester to the second clock domain requester, and sending an arbitration grant signal from the second clock domain requester to the first clock domain requester after the second clock domain requester determines that memory access requests from the second processor to the particular shared memory bank have been completed. The method includes synchronizing the arbitration request signal and the arbitration grant signal across different clock domains.

In general, in another aspect, an apparatus includes a memory device having a plurality of portions each configurable to operate according to multiple timing schemes; and means for enabling dynamic configuration of organization of the memory device to allow each portion of the memory device to be dynamically configured to be accessed according to a first timing scheme or a second timing scheme while executing an application program.

These and other aspects and features, and combinations of them, may be expressed as methods, apparatus, systems, means for performing functions, program products, and in other ways.

Advantages of the aspects, systems, and methods may include one or more of the following. The latency of memory access for each of the masters using the memory can be lowered because there is no need to convert memory requests from one clock domain to another. A single memory device can be shared by multiple masters, so the number of memory devices can be reduced, and the cost of the overall system can be reduced.

DESCRIPTION OF DRAWINGS

FIGS. 7-10, 11A, 11B, 12, 13A, 13B, 14, 15A, 15B, and 16 are example timing diagrams.

DETAILED DESCRIPTION

Figure 1:
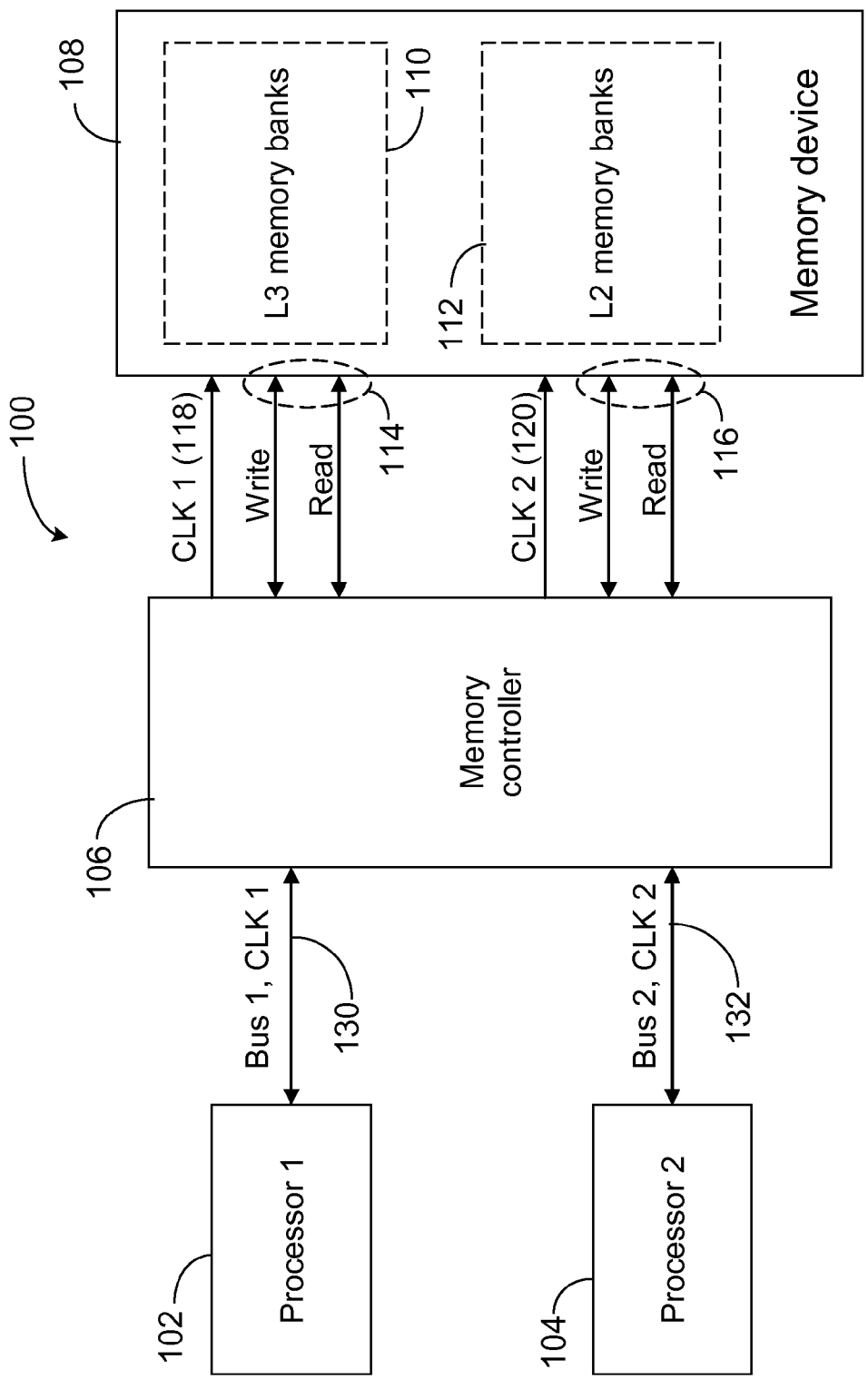
FIGS. 1 to 3 are schematic diagrams of an example system having configurable memory architecture.

Referring to FIG. 1, an example system 100 includes a first data processor 102 that accesses memory according to a first access timing scheme and data bus width, and a second data processor 104 that accesses memory according to a second access timing scheme and data bus width. A memory controller 106 dynamically configures the organization of a memory device 108 such that a first portion 110 of the memory device 108 can be accessed by the first data processor 102 according to its memory access requirements, and a second portion 112 of the memory device 108 can be accessed by the second data processor 104 according to its memory access requirements. The configuration of the first and second portions can be set during start-up of the system 100 or adjusted dynamically while application programs are executed by the first and second processors.

In some examples, the system 100 can be a system-on-a-chip (SoC) in which the first processor 102 is an embedded general purpose microprocessor (MCU), the second processor 104 is an embedded digital signal processor (DSP), and the memory device 108 is an embedded memory module. The first and second processors have different access timing and data width requirements. For example, the first processor 102 uses the first portion 110 of the memory as a system memory (or L3 memory), and accesses (either read or write) the first portion 110 of the memory device 108 through a first interface bus 130 having a first bus width. The second processor 104 uses the second portion 112 of the memory device 108 as a level-2 (L2) cache memory, and accesses (either read or write) the second portion 112 of the memory device 108 through a second bus 132 having a second bus width. In some examples, the first bus 130 is 32 bits wide, and the second bus 132 is 64 bits wide. In this case, access to the L2 memory 112 through the 64-bit wide bus 132 is faster than access to the L3 memory 110 through the 32-bit wide bus 132.

In some implementations, the memory device 108 has a 32-bit wide read/write port 114 for accessing the L3 memory 110 and a 64-bit wide read/write port 116 for accessing the L2 memory 112. The L3 memory 110 receives a first clock signal 118, which has a frequency that corresponds to the clock frequency that the first processor 102 uses to access the memory. The L2 memory 112 receives a second clock signal 120, which has a second frequency that corresponds to the clock frequency that the second processor 104 uses to access the memory. This allows parallel access to the L2 and L3 memory portions, in which each of the L2 and L3 memory portions is accessed according to its access timing scheme and bus width.

The example in FIG. 1 shows the memory device 108 being organized into two portions 110 and 112. The memory device 108 can also be organized into three or more portions that can be accessed using three or more access timing schemes and bus widths (assuming there are additional clock signals and data buses). Such a shared memory device may have interfaces to L1/L2/L3 clock domains, L2/L3/L4 clock domains, L1/L2/L3/L4 clock domains, and so on. The clock signals of different domains can be either synchronous or asynchronous with respect to each other.

Figure 2:
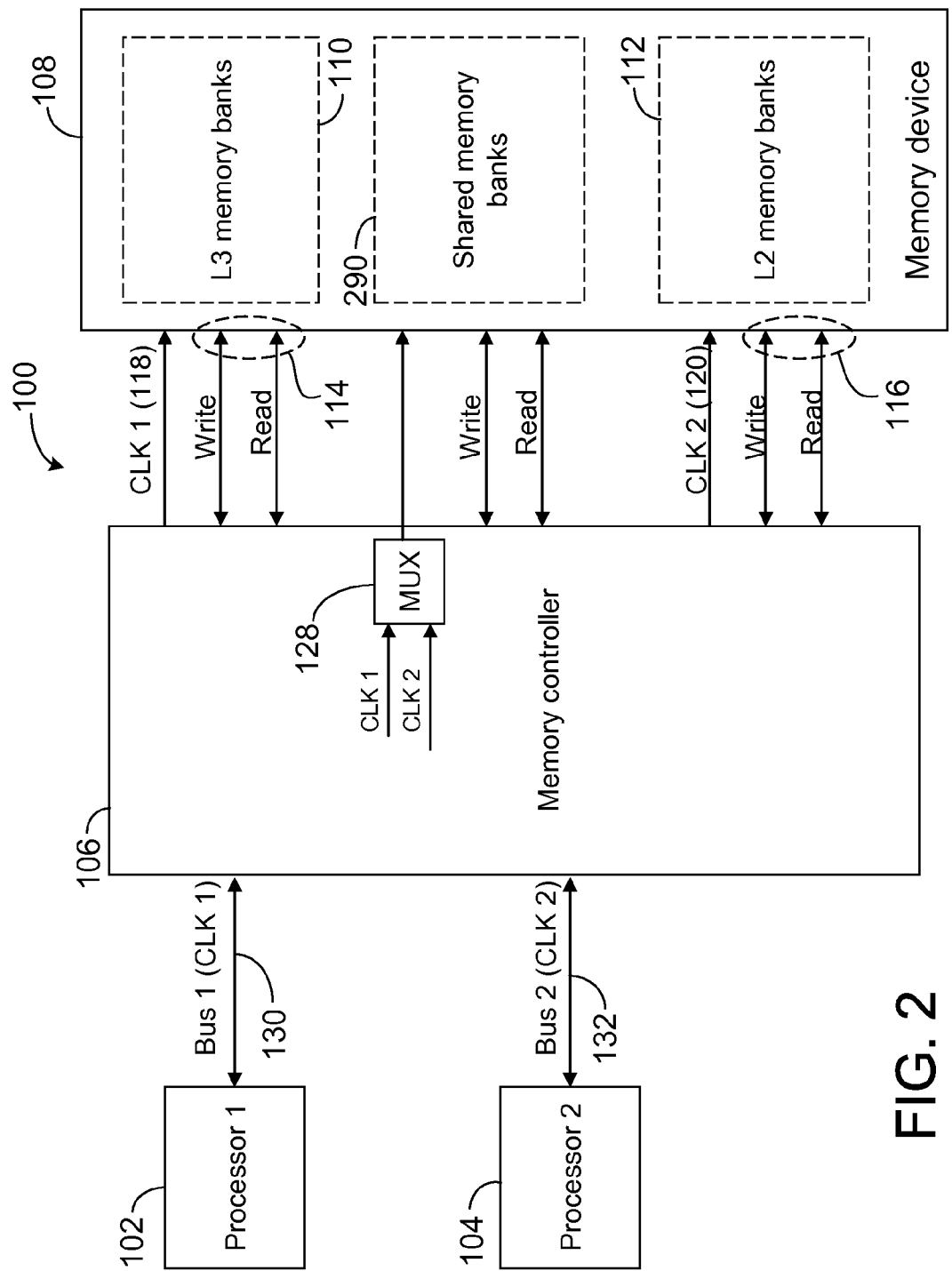

Referring to FIG. 2, it is possible to allocate a portion 110 of the memory 108 as L3 memory to be used exclusively by the first processor 102, a portion 112 of the memory 108 as L2 memory to be used exclusively by the second processor 104, and a portion 290 of the memory 108 as shared L2-L3 memory to be used by both the first and second processors. A multiplexer 128 is used to multiplex the first clock signal CLK 1 (118) and the second clock signal CLK 2 (120), and depending on which processor is accessing the shared memory portion 290, send a selected clock signal to the shared memory portion 290. In this example, depending on application, the memory controller 106 can dynamically adjust the ratio of L2 to L3 memory in the shared portion 290, but does not change the amount of L3 and L2 memory reserved for exclusive use by the first and second processors, respectively.

Figure 3:
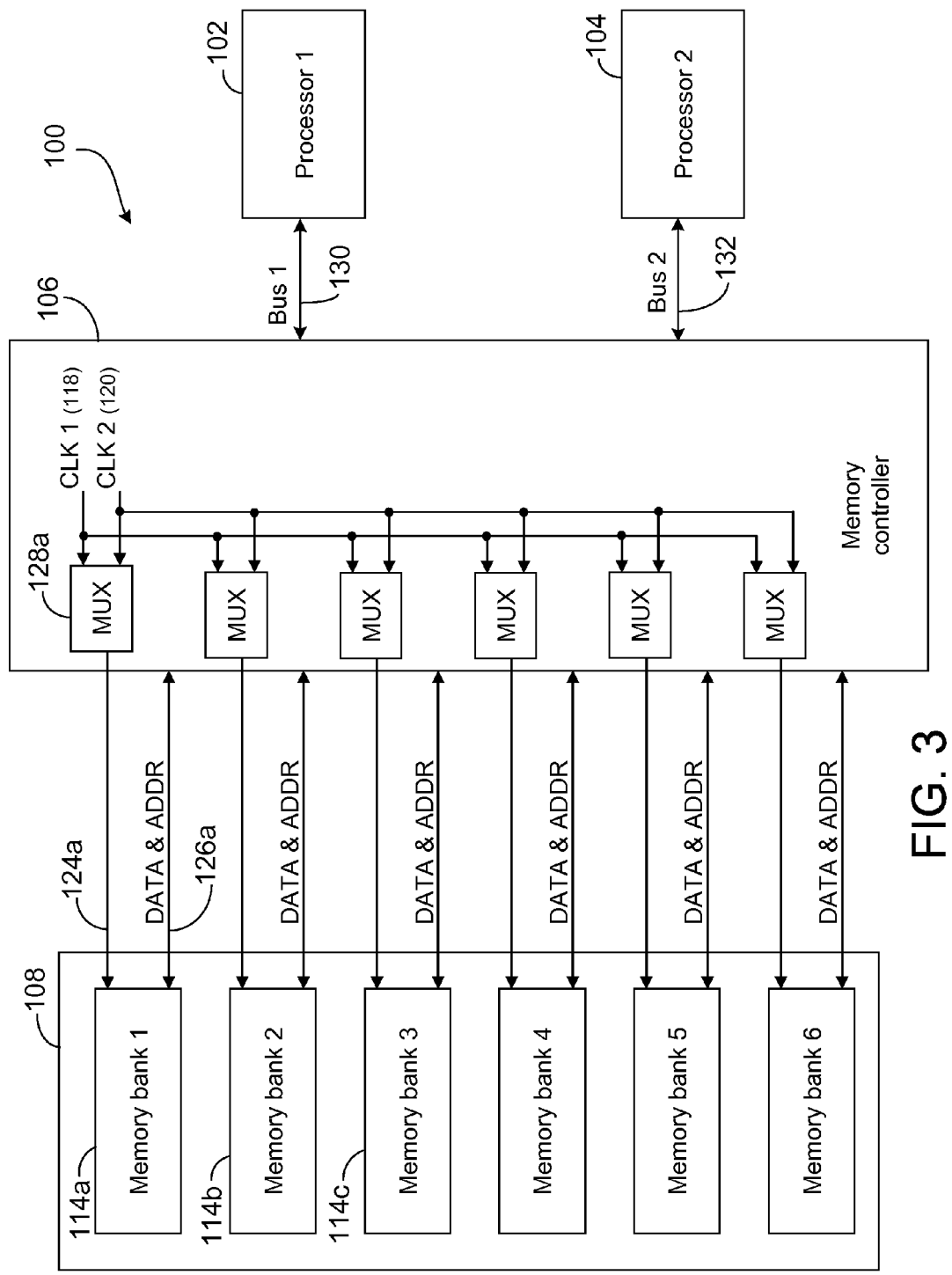

FIG. 3 is a schematic diagram of the system 100 illustrating an example architecture for enabling the memory device 108 to be re-configured dynamically. The memory device 108 can include several memory banks, such as 114a, 114b, 114c, etc., collectively referenced as 114. A memory controller 106 is configured to enable each memory bank 114 to be selectively accessed through the first data bus 130 or the second data bus 132. Each data bus (e.g., 126a) between the memory bank 114 and the memory controller 106 is sufficiently wide to support the maximum data-width operation. For example, each data bus can be 64-bit wide to allow either 32-bit or 64-bit operations.

In some implementations, the separation of the first and second portions is along a boundary of the memory banks so that L2 and L3 memory operations can generally be concurrent to increase system efficiency. Each memory bank receives a clock signal from a multiplexer (e.g., 128a), which multiplexes a first clock signal (CLK 1) 118 and a second clock signal (CLK 2) 120. In some examples, the first clock signal has a frequency of 150 MHz and the second clock signal has a frequency of 75 MHz. The first clock signal CLK 1 (118) and the second clock signal CLK 2 (120) can be either synchronous or asynchronous.

Other than clock frequencies, the L2 and L3 memory can have other accessing requirements that are different. For example, the L3 memory may have a late write requirement (where write data appears a half or whole clock cycle after the address), while the L2 memory does not. Because each bank of memory can be configured to be L2 or L3 memory, each bank of memory is configured to be able to support late write if this function is selected.

In some implementations, the memory controller 106 can configure the memory device 108 at start up to have a user-specified memory configuration. For example, suppose the memory device 108 has 8 Mb of total memory, a first user may set 2 Mb of the total memory to be used as L2 memory and 6 Mb of the total memory 108 as L3 memory, and a second user may set 7 Mb of the total memory to be used as L2 memory and 1 Mb of the total memory as L3 memory. For example, the system 100 can be booted from a FLASH (NAND or NOR) device. After start-up, the user-specified memory configurations (including memory controller configurations and clock configurations) are written to control registers as part of the boot process.

For example, the L2 port 116 and L3 port 114 can access the shared memory device 108 in parallel as long as the accesses are not to the same bank. Arbitration outside the shared memory device 108 can handle the priority and conflicts posed by the sharing feature. For example, when single port memory implementations are used for each memory bank, overlapping L2 and L3 accesses to the same memory bank 114 are not allowed.

In some implementations, the memory controller 106 enables re-configuration of the organization of the memory usage within active cycle times. This means that when a given application program starts working and needs more memory, the application program can re-configure the memory allocation on-the-fly, or with only a few cycles taken to switch or re-configure the memory allocation. For example, the memory architecture can be designed such that the first portion of the memory is activated with one clock edge and the second portion of the memory is activated with a different clock edge.

By supporting different data widths and access times, the system 100 allows for application specific optimization of L2 and L3 memory resources and improves die area (cost). The shared memory device 108 can have multiple read and write ports of different data widths having different access timings per port. Each application can be optimized independently of the fixed memory size in hardware by trading off L2 memory usage verses L3 memory usage. In addition, the user can dynamically change the L2 verses L3 memory allocation as desired without incurring a configuration step or associated delay (except for a delay of a few cycles when switching from one clock domain to another).

Given only a single access can occur to a memory bank at a time, concurrent accesses by the L2 and L3 interfaces can only occur to different memory banks. To handle the potential of L2 and L3 access conflict to the same bank, arbitration is used to insure no concurrent L2 and L3 accesses to the same bank.

The shared L2-L3 memory further improves system performance by eliminating the need for L3 to L2 memory transfers and vice-versa (which may be necessary if one of the processors 102 and 104 can only access the L2 or L3 memory). This means that the shared L2-L3 memory allows either the first processor 102 or second processor 104 to operate on the same data without requiring memory transfers, thereby improving system efficiency. In the system 100, the latency of memory access for the processors 102 and 104 can be lowered, as compared to a conventional system that uses a bridging process to convert memory requests from one clock domain to another. Using a single memory module instead of two memory modules reduces the area on the semiconductor chip, reducing the cost of the system 100.

These multiple memory banks may have the same or different native data widths and bank access times. The memory banks 114 can include native 32-bit banks, native 64-bit banks, or a combination of them. Factors such as access time, area, aspect ratio, power consumption, and potential L2 versus L3 usage are taken into account when designing the memory banks.

Figure 4:
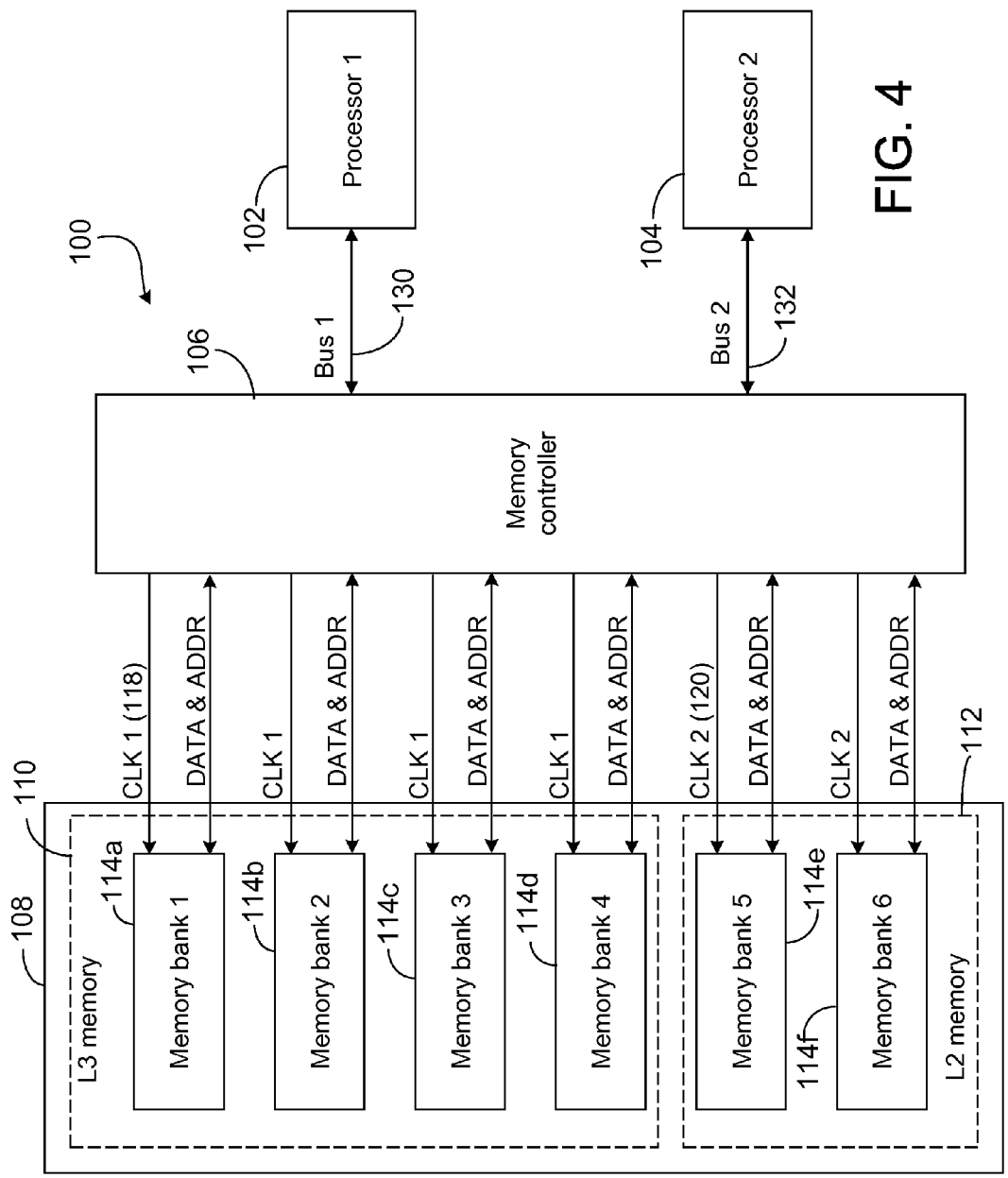
FIGS. 4 and 5 show various examples of memory access configurations.

The system 100 allows dynamic configuration of the memory organization during execution of an application program. For example, referring to FIG. 4, suppose there is a total of 6 Mb of shared memory, and each memory bank corresponds to 1 Mb. An application program may determine that it needs 4 Mb of L3 memory and 2 Mb of L2 memory, and sends instructions to the memory controller 106 to reconfigure the organization of the shared memory. As shown in FIG. 4, memory banks 114a to 114d are configured as part of the L3 memory 110, each bank receives the first clock signal CLK 1 (118) and is accessed through the first data bus 130 using an access timing scheme associated with the L3 memory 110. Memory banks 114e and 114f are configured as part of the L2 memory 112, each bank receives the second clock signal CLK 2 (120) and is accessed through the second data bus 132 using an access timing scheme associated with the L2 memory 112.

During execution, the application program may determine that it needs more L2 memory 112. For example, referring to FIG. 5, the application program may request an increase of L2 memory 112 to 4 mega bits and a decrease of L3 memory 110 to 2 mega bits, and sends instructions to the memory controller 106 to reconfigure the organization of the shared memory accordingly. After a few clock cycles (e.g., five clock cycles or less of the slower clock) of reconfiguring the memory device 108, memory banks 114a and 114b are configured as part of the L3 memory 110, each bank receives the first clock signal 118 and is accessed through the first data bus 130 using an access timing scheme associated with the L3 memory 110. Memory banks 114c to 114f are configured as part of the L2 memory 112, in which each bank receives the second clock signal 120 and is accessed through the second data bus 132 using an access timing scheme associated with the L2 memory 112.

The amount of time required for reconfiguring the ratio of L2 to L3 memory can vary depending on the memory structure and the configuration of the memory controller 106. In some implementations, reconfiguring the ratio of L2 to L3 memory may take more than five clock cycles to complete. In some implementations, reconfiguring the ratio of L2 to L3 memory may require three cycles or less of the slower processor's clock.

Figure 5:
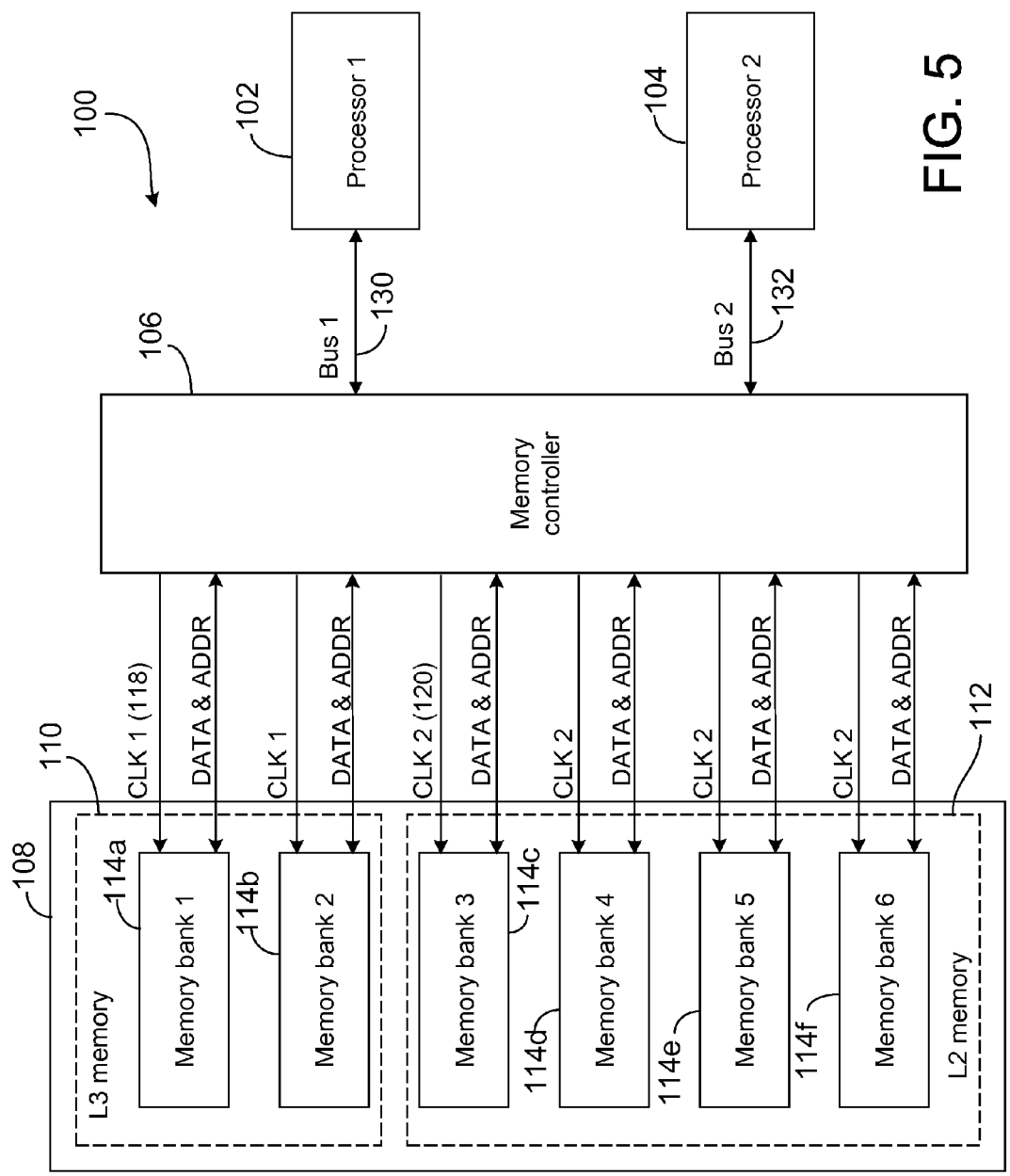

In the example of FIGS. 4 and 5, the memory banks 1 to 6 can be accessed by either the first processor 102 or the second processor 104. There are several types of memory devices that can be used to implement the shared memory banks 1 to 6. For example, some memory devices are optimized for 32-bit native accesses (herein referred to as 32-bit memory devices), and some memory devices are optimized for 64-bit native accesses (herein referred to as 64-bit memory devices). The shared memory banks 1 to 6 can be implemented by (a) using only 32-bit memory devices, (b) using only 64-bit memory devices, or (c) using a combination of 32-bit and 64-bit memory devices.

When the combination implementation is chosen, the optimal power consumption usage is to have the first processor 102 access the 32-bit memory devices and the second processor 104 access the 64-bit memory devices. The portion of the memory banks implemented using 32-bit memory devices and the portion of the memory banks implemented using 64-bit memory devices can be determined based on predicted usage of the first and second processors. For example, if it is predicted that, for most applications, the first processor 102 will likely use 4 mega bits of L3 memory and the second processor 104 will likely use 2 mega bits of L2 memory, then memory banks 1 to 4 can be implemented using 32-bit memory devices and memory banks 5 and 6 can be implemented using 64-bit memory devices. It should be noted that this scheme is not limited to 32-bit and 64-bit memory devices. Memory devices with other native bus widths, such as 128-bit and 64-bit, 128-bit and 32-bit, 32-bit and 16-bit, 64-bit and 16-bit, and other sizes not necessarily based on a power of 2 (e.g., 48-bit and 24-bit), can also be adopted.

In the example above, during operation of the system 100, optimal power consumption usage can be achieved if the first processor 102 accesses memory banks 1 to 4 and the second processor 104 accesses memory banks 5 and 6 (as shown in FIG. 4). It is possible to reconfigure the memory usage to allow the first processor 102 to access memory banks 1 and 2 and allow the second processor 104 to access memory banks 3 to 6 (as shown in FIG. 5), but using the second processor 104 to access memory banks 3 and 4 may increase power consumption because memory banks 3 and 4 are not optimized for the 64-bit memory accesses used by the second processor 104.

An advantage of the system 100 is that a person designing the system 100 does not need to understand the implementation details of the memory device 108 in order to design the system to allow the first processor 102 to access portions of the memory 108 according to the first clock frequency and to allow the second processor 104 to access portions of the memory 108 according to the second clock frequency. Another advantage of the system 100 is that, because the shared memory device is available to both processors and clock domains, there is no need to transfer memory contents between two interfaced clocks domains.

Figure 6A:
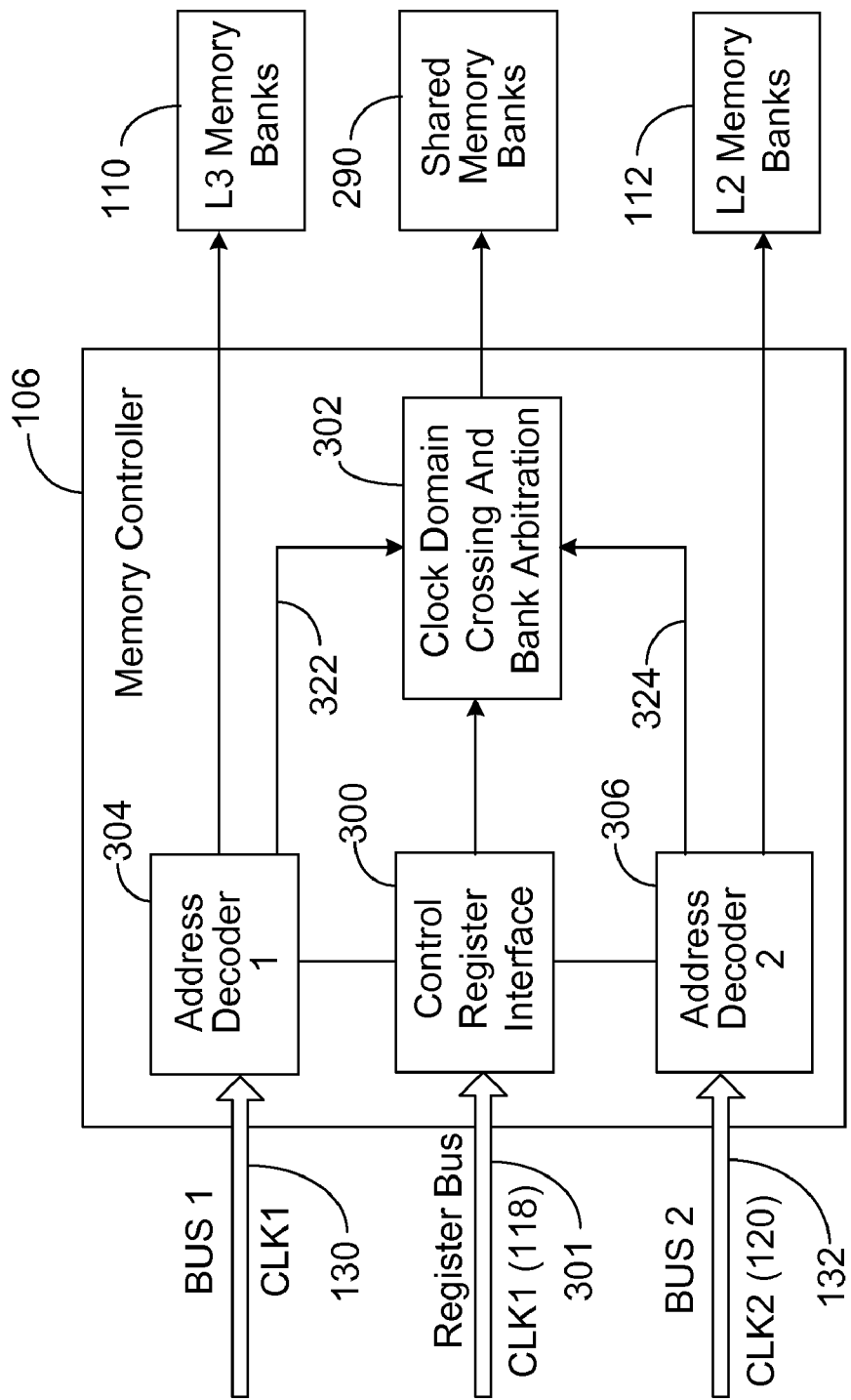
FIG. 6A is a block diagram of an example memory controller.

FIG. 6A is a diagram of an example memory controller 106. The memory controller 106 includes a control register interface 300 that receives register control data from a system controller (not shown) via a register bus 301. The register control data can be used to configure the memory controller 106 and the memory banks, such as the sizes of the L2 and L3 memory portions. The register control data can be retrieved from a FLASH memory during start-up. The control register interface 300 sends information to a first address decoder 304 and a second address decoder 306 to specify which memory addresses are associated with the L3 memory banks 110 that are used exclusively by the first processor 102, L2 memory banks 112 that are used exclusively by the second processor 104, and shared memory banks 290 that can be accessed by both processors 102 and 104. In this example, data on the register bus 301 is synchronized to the first clock signal CLK 1 (118).

A memory access request (e.g., read or write request) on the first data bus 130 is received by the first address decoder 304, which determines whether the memory access request is for the reserved L3 memory banks 110 or shared memory banks 290. If the memory request is for the reserved L3 memory banks 110, the memory controller 106 accesses the L3 memory banks 110 according to the memory request. Both the first data bus 130 and the L3 memory banks 110 are synchronized to the first clock signal CLK1 (118).

If the memory access request on the first data bus 130 is for the shared memory banks 290, the request is sent to a clock domain crossing and bank arbitration unit 302 through a bus 322. The shared memory banks 290 have a first portion configured as L3 memory and a second portion configured as L2 memory. Depending on whether the memory access request is for the first or second portion, the memory controller 106 accesses the portion of the shared memory banks 290 using the appropriate clock frequency and timing scheme. The clock domain crossing and bank arbitration unit 302 also arbitrates requests that access the same memory bank to prevent conflicts.

A memory access request on the second data bus 132 is received by the second address decoder 306, which determines whether the memory access request is for the reserved L2 memory banks 110 or the shared memory banks 290. If the memory request is for the reserved L2 memory banks 110, the memory controller 106 accesses the L2 memory banks 112 according to the memory request. Both the second data bus 132 and the L2 memory banks 112 are synchronized to the second clock signal CLK2 (120).

If the memory access request on the second data bus 132 is for the shared memory banks 290, the request is sent to the clock domain crossing and bank arbitration unit 302 through the bus 324. Depending on whether the memory access request is for the first portion of the shared memory banks 290 (which is configured as L3 memory) or the second portion of the shared memory banks 290 (which is configured as L2 memory), the memory controller 106 accesses the portion of the shared memory banks 290 using the appropriate clock frequency and timing scheme.

In some implementations, the configurations of the memory controller 106 and the memory device 108 can be changed by writing register data through the control register interface 300. For example, during execution of an application program, the application program may cause the system controller to write to registers in the memory controller 106 to change the allocation of the memory banks to the L2 and L3 portions.

In some examples, the memory controller 106 monitors execution of memory access instructions and determines when it is appropriate for a memory bank to switch between L2 and L3 configurations. When the memory controller 106 receives control register data via the control register interface 300 indicating that a memory bank is to switch from a first clock frequency to a second clock frequency, the memory controller 106 determines whether a previous memory access instruction for accessing the memory bank (using the first clock frequency) has been completed before switching to the second clock frequency.

Figure 6B:
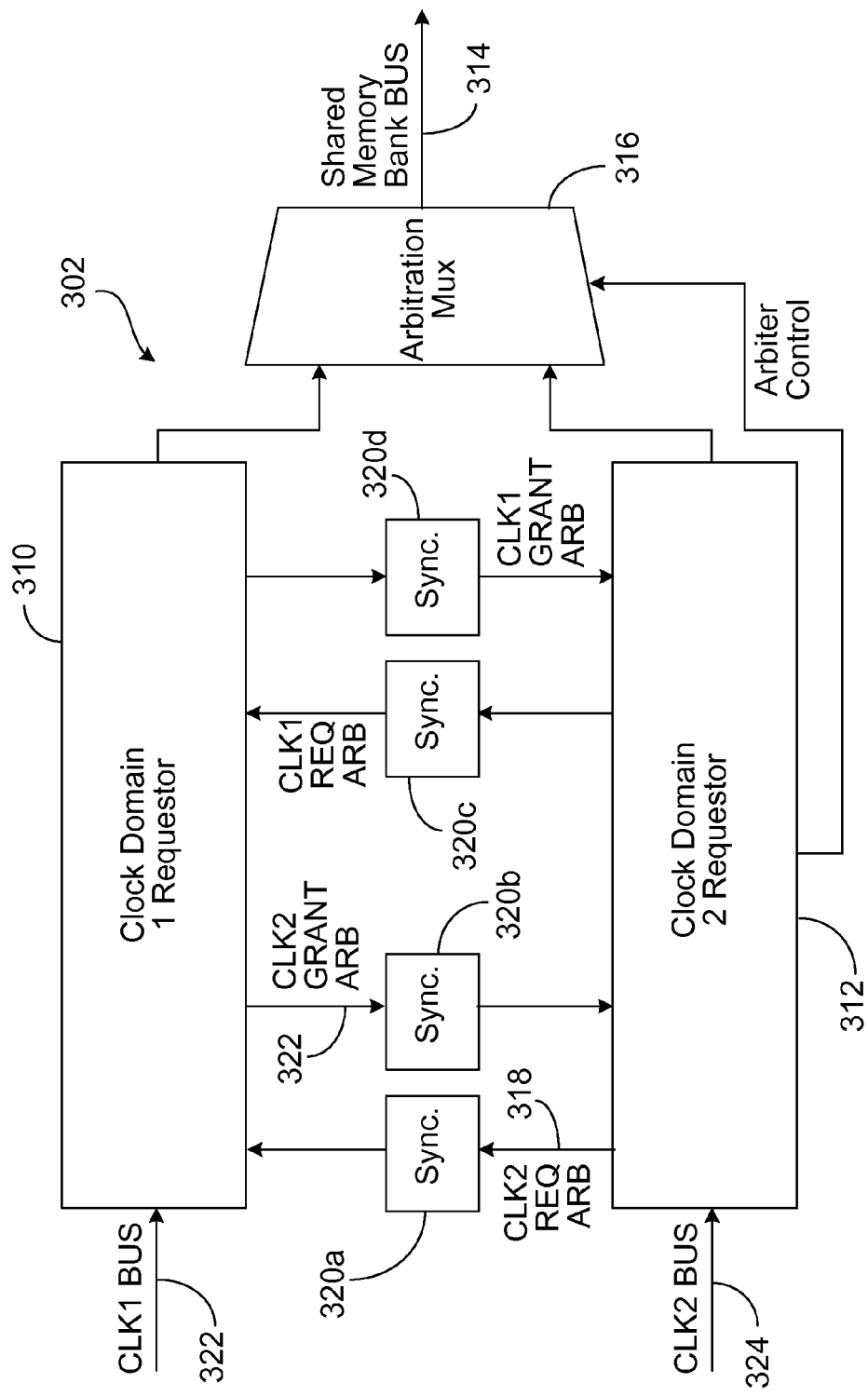
FIG. 6B is a diagram of a clock domain crossing and bank arbitration unit.

FIG. 6B is a diagram of the clock domain crossing and bank arbitration unit 302, which uses a handshaking process between a first clock domain requester 310 and a second clock domain requester 312 to enable arbitration of memory access requests sent from the first processor 102 and the second processor 104. The first clock domain requester 310 is a logic circuit that is synchronized to the first clock signal CLK 1 (118), and receives read and write memory access instructions from the first processor 102 through the bus 322. The second clock domain requestor 312 is a logic circuit that is synchronized to the second clock signal CLK 2 (120), and receives read and write memory access instructions from the second processor 104 through the bus 324.

The clock domain crossing and bank arbitration unit 302 allows either the first processor 102 (which operates in the first clock domain) or the second processor 104 (which operates in the second clock domain) to access the shared memory banks 290 through a shared memory bank bus 314. The clock domain currently granted the shared memory bank bus 314 retains control of the bus 314 until a synchronized arbitration request from the other clock domain is granted by the controlling clock domain. Both the arbitration request and the arbitration grant are synchronized. One clock domain requester, either clock domain requester 310 or 312, may then output the arbitration result to an arbitration multiplexer 316, which sends a selected memory request to the designated shared memory bank 290.

Figure 17:
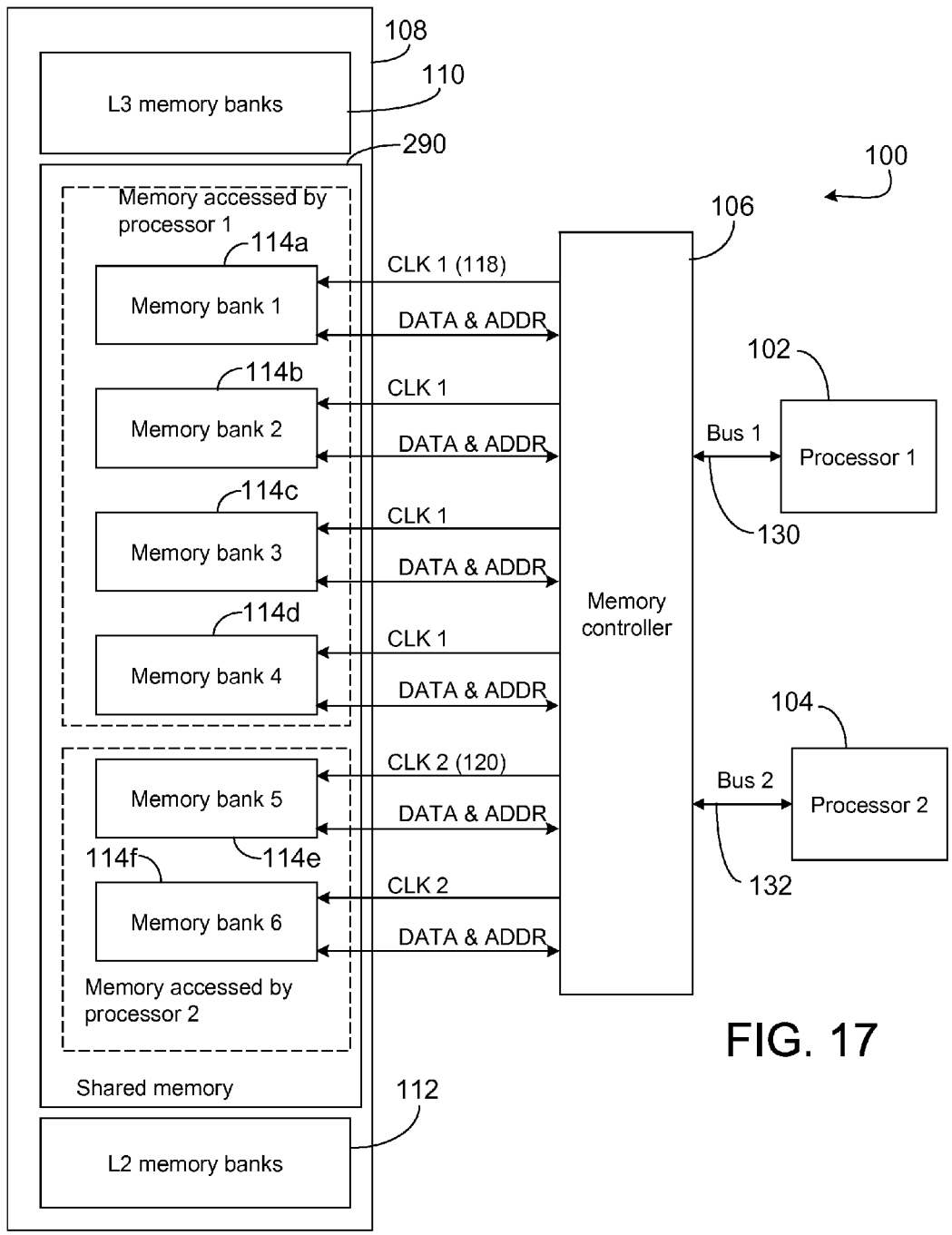
FIGS. 17 and 18 show various examples of memory access configurations.
Figure 18:
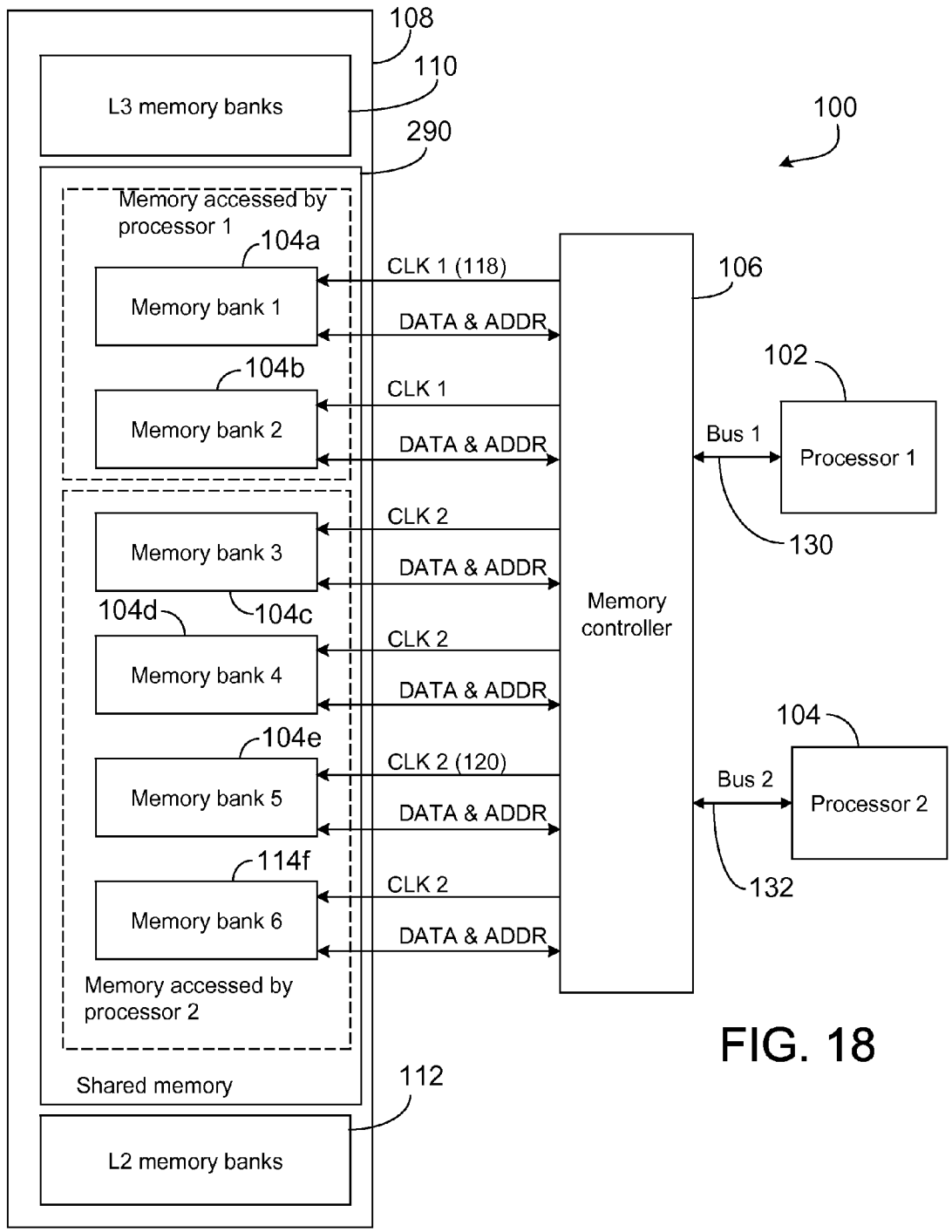

For example, referring to FIGS. 17 and 18, suppose the shared memory banks 290 include the memory banks 1 to 6 of the memory 108. The following describes a process in which the memory controller 106 is first configured to access the memory 108 as shown in FIG. 17, in which the first processor 102 accesses memory banks 1 to 4, and the second processor 104 accesses the memory banks 5 and 6, then re-configured to access the memory 108 as shown in FIG. 18, in which the first processor 102 accesses the memory banks 1 and 2, and the second processor 104 accesses the memory banks 3 to 6. The memory banks in the shared memory 290 that are accessed by the first processor 102 are referred to as L3 memory banks in the shared memory 290, and the memory banks in the shared memory 290 that are accessed by the second processor 104 are referred to as L2 memory banks in the shared memory 290.

An arbitration handshake process between processors 102 and 104 is handled by the first clock domain requester 310 and the second clock domain requester 312 in FIG. 6B to ensure that all memory accesses to the memory banks 3 and 4 in the first clock domain (CLK 1) have been completed before the memory banks 3 and 4 are switched from being accessed by the first processor 102 to being accessed by the second processor 104. The second clock domain requester 312 requests access to the memory banks 3 and 4 by sending an arbitration request 318 to the first clock domain requester 310. A synchronization unit 320a receives the request 318 from the second clock domain requester 312 and synchronizes the request 318 with the first clock signal CLK 1 (118) before sending the request 318 to the first clock domain requestor 310. The first clock domain requestor 310 determines whether there are pending memory accesses to the memory banks 3 and 4. If there are pending memory accesses, the first clock domain requester 310 waits until the memory accesses are completed, then sends an arbitration granted signal 322 to the second clock domain requestor 312. The arbitration granted signal 322 is synchronized by a synchronization unit 320b. Afterwards, the memory banks 3 and 4 can be accessed by the second processor 104, as shown in FIG. 18.

When the memory controller 106 is configured to enable access of the memory banks 3 and 4 by the first processor 102 (as in FIG. 17), the arbitration multiplexer 316 allows memory access requests from the first clock domain requester 310 to pass to the memory banks 3 and 4. Afterwards, if the first processor 102 accesses the memory banks 3 and 4, the first clock domain requestor 312 sends the memory access requests to the memory banks 3 and 4 directly without using the arbitration process and the first processor 102 experiences no latency due to arbitration.

When the memory controller 106 is re-configured to allow the second processor 104 to access memory banks 3 and 4 (as in FIG. 18), an arbitration process described above is used to ensure proper switch-over, and there is a delay while waiting for the arbitration process to be completed. After the arbitration process is completed and the memory controller 106 is re-configured to allow the second processor 104 to access memory banks 3 and 4, the arbitration multiplexer 316 allows memory access requests from the second clock domain requester 312 to pass to the memory banks 3 and 4. Afterwards, if the second processor 104 accesses the memory banks 3 and 4, the second clock domain requestor 312 sends the memory access requests to the memory banks 3 and 4 directly without using the arbitration process and the second processor 104 experiences no latency due to arbitration.

Thus, as discussed above, continued accesses of a shared memory bank from a single clock domain experience no latency of arbitration. However, there is arbitration penalty for switching clock domains, including multiple clock domain synchronization delays.

Below are examples of access timing schemes for the L2 memory 112 (and memory banks in the shared memory 290 accessed by the second processor 104) and the L3 memory 110 (and memory banks in the shared memory 290 accessed by the first processor 102).

Figure 7:
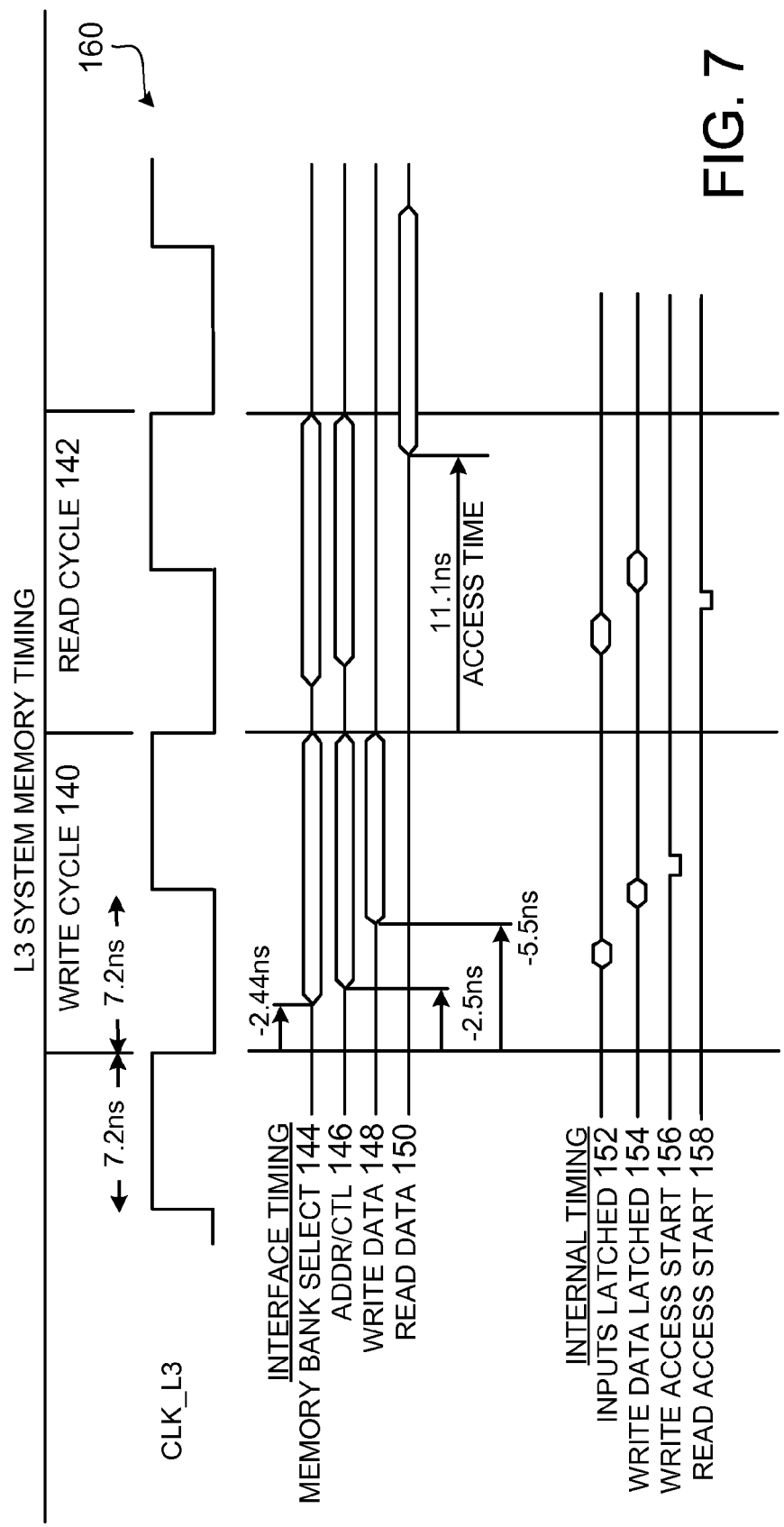

FIG. 7 is an example L3 memory timing diagram 160. The diagram 160 shows signal levels for the interface timing and internal timing during the write cycle 140 and the read cycle 142 using a clock signal CLK_L3 as reference. The signals related to interface timing include a memory bank select signal 144, an address and control signal 146, write data 148, and read data 150. The signals related to internal timing include an input latched indication signal 152, a write data latched indication signal 154, a write access start signal 156, and a read access start signal 158. In this example, all L3 operations, except write access start, are self timed from the falling edge of the clock signal CLK_L3.

Figure 8:
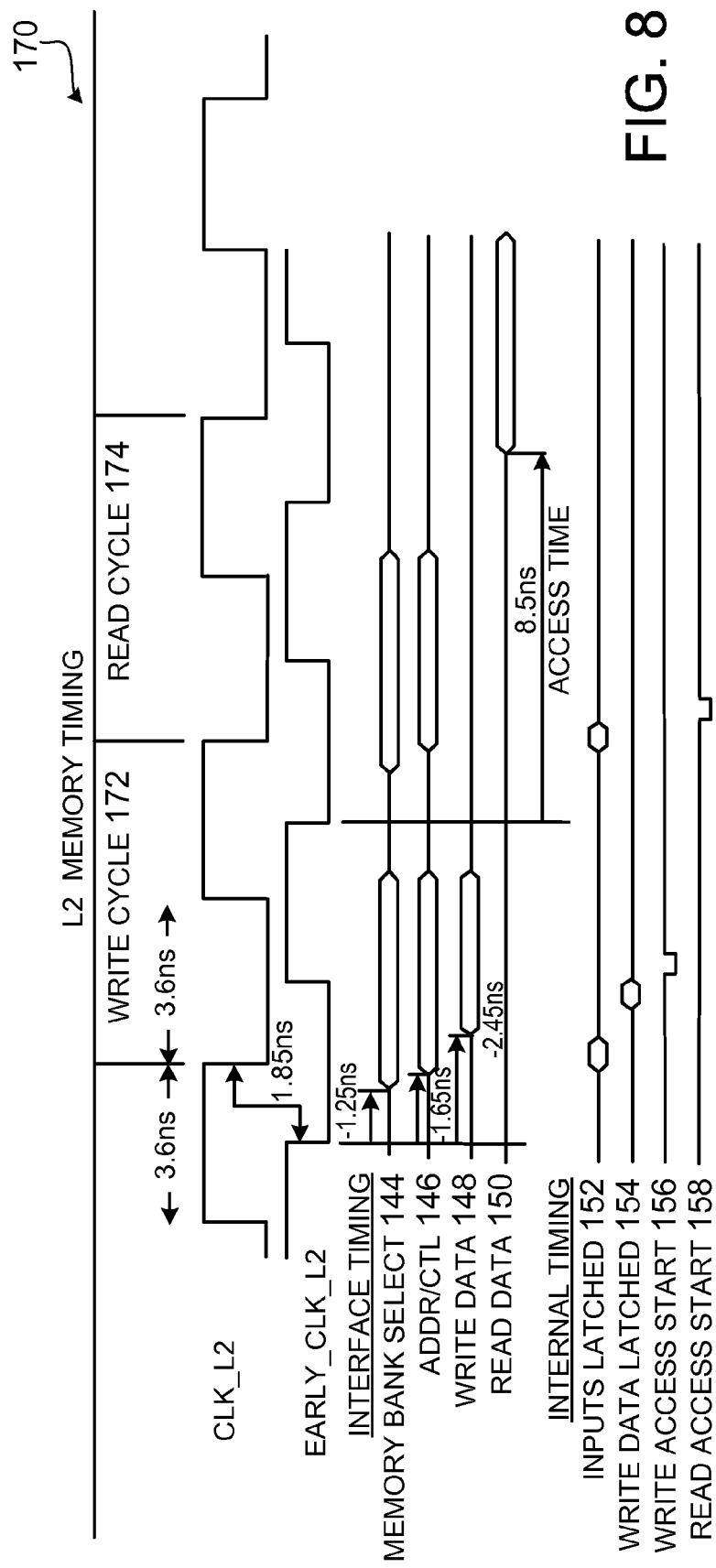

FIG. 8 is an example L2 memory timing diagram 170. The diagram 170 shows signal levels for the interface timing and internal timing during the write cycle 172 and the read cycle 174 using clock signals CLK_L2 and Early_CLK_L2 as references. The CLK_L2 clock signal is used to latch outputs. The Early_CLK_L2 signal triggers write and read accesses. In this example, all L2 memory operations, except output data latching, are self timed from the falling edge of the clock signal Early_CLK_L2.

FIG. 9 is an example timing diagram 180 for the case where L2 and L3 memory accesses are interleaved and directed to the same memory bank. The L2 memory uses the clock signal CLK_L2 as reference, and the L3 memory uses the clock signal CLK_L3 as reference. In this example, the clock signals CLK_L2 and CLK_L3 have the same frequency.

FIG. 10 is an example timing diagram 190 for the case where L2 and L3 memory accesses are directed to different memory banks and can occur concurrently. The L2 memory uses the clock signal CLK_L2 as reference, and the L3 memory uses the clock signal CLK_L3 as reference. In this example, the clock signals CLK_L2 and CLK_L3 have the same frequency.

Figure 11A:
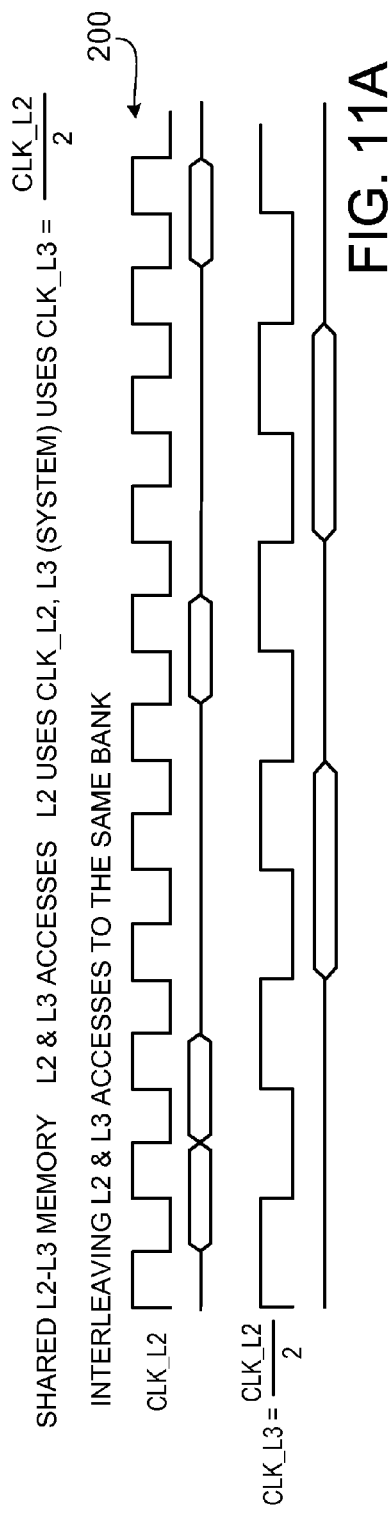
Figure 11B:
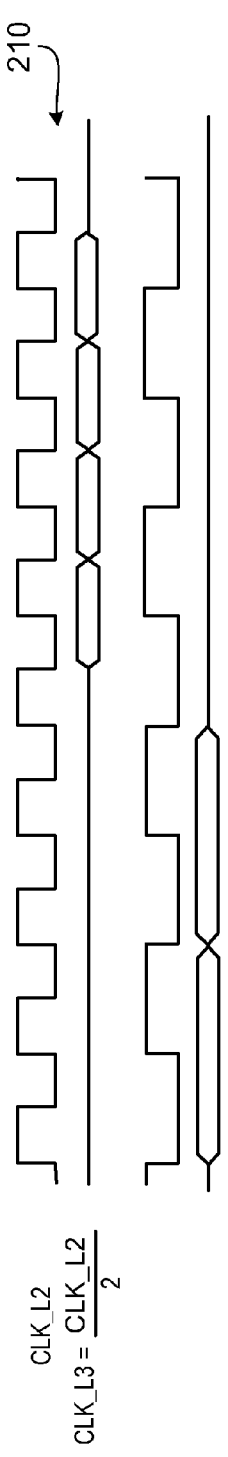

FIGS. 11A and 11B are example timing diagrams 200 and 210 for the case where L2 and L3 memory accesses are interleaved and directed to the same memory bank. The L2 memory uses the clock signal CLK_L2 as reference, the L3 memory uses the clock signal CLK_L3 as reference, and the clock signal CLK_L2 has a frequency that is twice the frequency of the clock signal CLK_L3.

Figure 12:
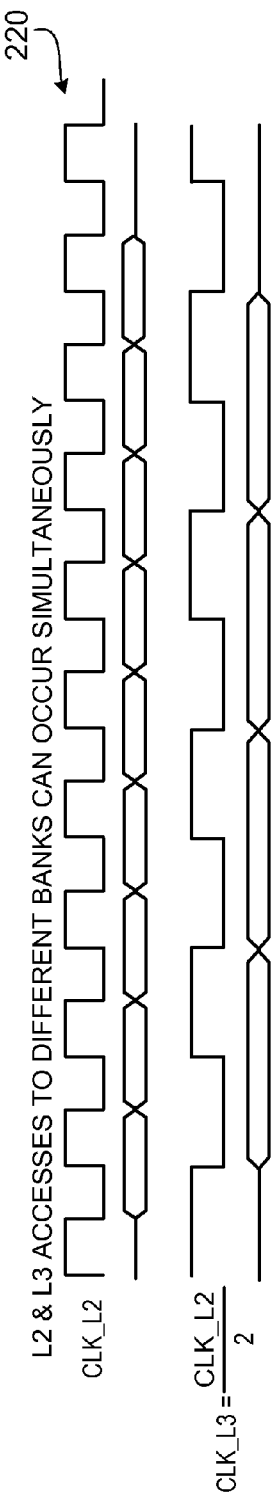

FIG. 12 is an example timing diagram 220 for the case where L2 and L3 memory accesses are directed to different memory banks and can occur concurrently. The L2 memory uses the clock signal CLK_L2 as reference, the L3 memory uses the clock signal CLK_L3 as reference, and the clock signal CLK_L2 has a frequency that is twice the frequency of the clock signal CLK_L3.

Figure 13A:
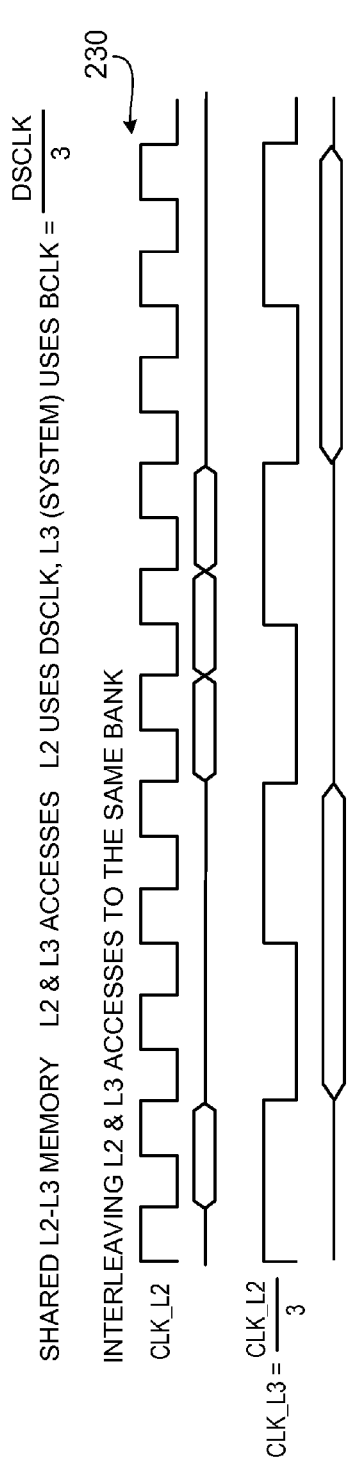
Figure 13B:
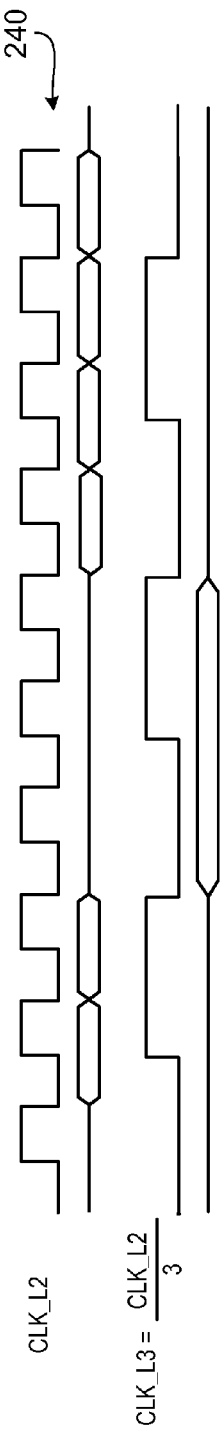

FIGS. 13A and 13B are example timing diagrams 230 and 240 for the case where L2 and L3 memory accesses are interleaved and directed to the same memory bank. The L2 memory uses the clock signal CLK_L2 as reference, the L3 memory uses the clock signal CLK_L3 as reference, and the clock signal CLK_L2 has a frequency that is three times the frequency of the clock signal CLK_L3.

Figure 14:
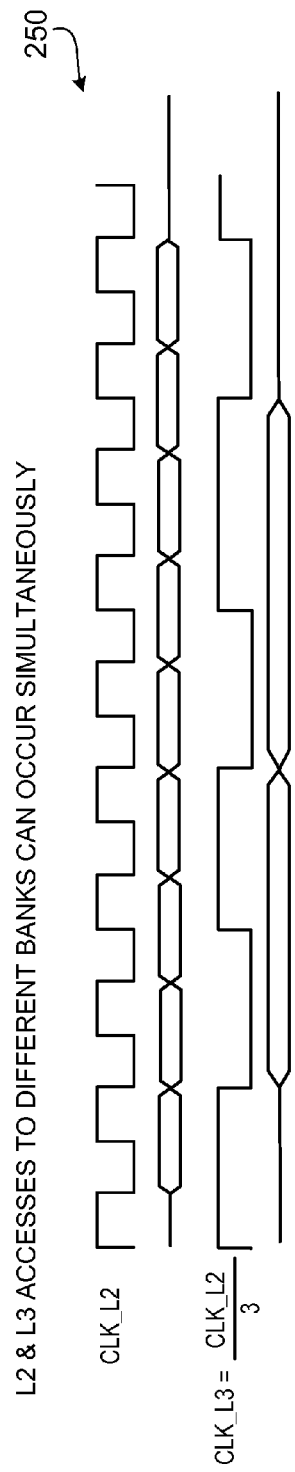

FIG. 14 is an example timing diagram 250 for the case where L2 and L3 memory accesses are directed to different memory banks and can occur concurrently. The L2 memory uses the clock signal CLK_L2 as reference, the L3 memory uses the clock signal CLK_L3 as reference, and the clock signal CLK_L2 has a frequency that is three times the frequency of the clock signal CLK_L3.

FIGS. 15A and 15B are example timing diagrams 260 and 270 for the case where L2 and L3 memory accesses are interleaved and directed to the same memory bank. The L2 memory uses the clock signal CLK_L2 as reference, the L3 memory uses the clock signal CLK_L3 as reference, and the clock signal CLK_L2 has a frequency that is four times the frequency of the clock signal CLK_L3.

FIG. 16 is an example timing diagram 280 for the case where L2 and L3 memory accesses are directed to different memory banks and can occur concurrently. The L2 memory uses the clock signal CLK_L2 as reference, the L3 memory uses the clock signal CLK_L3 as reference, and the clock signal CLK_L2 has a frequency that is four times the frequency of the clock signal CLK_L3.

It should be appreciated that various aspects of the present invention may be may be used alone, in combination, or in a variety of arrangements not specifically discussed in the implementations described in the foregoing and is therefore not limited in its application to the details and arrangement of components set forth in the foregoing description or illustrated in the drawings.

Although some examples have been discussed above, other implementations and applications are also within the scope of the following claims. Various aspects of the invention described herein may be implemented in any of numerous ways. For example, the various components described above may be implemented in hardware, firmware, software or any combination thereof. The memory device 108 can be divided into two portions, and the two portions do not necessarily have to be accessed as L2 and L3 memory. The two portions can be treated as two L3 memory modules, or two L2 cache memory modules, etc. The labeling of "L2 memory" and "L3 memory" (or "system memory") in the description is only for illustration of the examples.

In the example of FIGS. 4 and 5, the boundaries of the L2 and L3 memory align with the boundaries of the memory banks. It is also possible to design the system 100 so that the memory device 108 can be configured according to blocks, which can include more than one memory bank, and do not necessarily align with memory banks. Each memory block can receive a separate clock signal and can have a separate read/write access port. The timing diagrams for the L2 and L3 memory can be different from those shown in FIGS. 7-16.

In the examples of FIGS. 2-5, the multiplexers 128 are placed in the memory controller 106, and the selected clock signals are provided from the memory controller 106 to the memory banks 114. It is also possible to place the multiplexers 128 outside of, but still controlled by, the memory controller 106.

In the examples of FIGS. 17 and 18, each of the six memory banks can be accessed by the first processor 102 or the second processor 104. In some implementations, the clock domain crossing and bank arbitration unit 302 can have six arbitration multiplexers 316 each associated with a separate shared memory bus 314 to allow concurrent access to the six shared memory banks. In some implementations, only one arbitration multiplexer 315 and one shared memory bus 314 is used. This allows less concurrency of access, but improves access timing and reduces logic complexity.

The memory device 108 can be a dynamic random access memory (DRAM) device, a static random access memory (SRAM) device, or other types of memory. The widths of the buses 130 and 132 can be different from those described above. For example, one of the buses can be 128 bit wide, or wider.

What is claimed is:

1. An apparatus comprising:
    a first processor that accesses memory according to a first clock frequency;
    a second processor that accesses memory according to a second clock frequency;
    a memory device configurable to selectively operate according to the first clock frequency or the second clock frequency; and
    a memory controller to enable dynamic configuration of organization of the memory device to allow a first portion of the memory device to be accessed by the first processor according to the first clock frequency and a second portion of the memory device to be accessed by the second processor according to the second clock frequency, in which the memory controller comprises
        a first clock domain requestor that operates according to the first clock frequency and passes memory access instructions from the first processor to the shared memory banks, and
        a second clock domain requestor that operates according to the second clock frequency and passes memory access instructions from the second processor to shared memory banks, and only one of the first and second clock domain requestors is granted access to any particular shared memory bank at a given time;
    wherein the memory controller is configured such that after access to a particular shared memory bank is granted to the first processor, the second clock domain requestor sends an arbitration request signal to the first clock domain requestor, and the first clock domain requestor sends an arbitration grant signal to the second clock domain requestor after the first clock domain requestor determines that memory access requests from the first processor to the particular shared memory bank have been completed.

2. The apparatus of claim 1 in which the memory controller enables re-configuration of the organization of the memory device to adjust the sizes of the first and second portions while the first processor is executing an application program.

3. The apparatus of claim 1 in which the memory controller enables re-configuration of the organization of the memory device to adjust the sizes of the first and second portions upon start-up of the memory device and the memory controller.

4. The apparatus of claim 1 in which the memory device comprises a plurality of memory banks and the memory controller allocates the first and second portions of the memory device along boundaries of memory banks.

5. The apparatus of claim 4, comprising multiplexers each associated with a memory bank, each multiplexer selecting from a first clock signal having the first clock frequency and a second clock signal having the second clock frequency and passing the selected clock signal to the corresponding memory bank.

6. The apparatus of claim 1 in which the memory controller enables dynamic configuration of the organization of the memory device to allow a third portion of the memory device to be accessed exclusively by the first processor according to the first clock frequency.

7. The apparatus of claim 6 in which the memory controller enables re-configuration of the memory device to adjust the sizes of the first and second portions, and the memory controller comprises an address decoder to receive memory access requests from the first processor and determine whether the memory access requests are for accessing the first or third portion of the memory device.

8. The apparatus of claim 1 in which the memory controller re-configures the organization of the memory device to re-allocate the sizes of the first and second portions of the memory device using five or less clock cycles according to the slower of the first and second clock frequencies.

9. The apparatus of claim 1 in which the first portion of the memory device is accessed using a first bus width, and the second portion of the memory device is accessed using a second bus width.

10. The apparatus of claim 1 in which the memory controller monitors execution of memory access instructions, and upon receiving a signal to switch from a first memory access clock frequency to a second memory access clock frequency for accessing a segment of the memory device, determines whether a previous memory access instruction using the first memory access clock frequency for the segment of the memory device has been completed before switching to the second memory access clock frequency.

11. The apparatus of claim 1 in which the memory controller comprises an arbitration unit to arbitrate accesses to shared memory banks of the memory by the first and second processors.

12. The apparatus of claim 1 in which the first clock domain requestor is granted access to a particular shared memory bank until the second clock domain requestor requests access to the particular shared memory bank, upon which the first and second clock domain requestors perform an arbitration process to determine whether the second clock domain requestor can be granted access to the particular shared memory bank.

13. The apparatus of claim 1 in which the memory controller comprises one or more synchronization units that synchronize the arbitration request signal and arbitration grant signal across different clock domains.

14. The apparatus of claim 1 in which the memory device is configurable to selectively operate according to three or more clock frequencies, and the memory controller enables dynamic configuration of the memory device to allow a portion of the memory device to be accessed according to any of the clock frequencies in which the memory device is operable.

15. The apparatus of claim 1 in which the memory controller automatically determines an organization of the memory device based on which processor is accessing the memory and the clock frequency of the access.

16. The apparatus of claim 15 in which the memory controller enables dynamic configuration of the memory to allow the entire memory to be accessible by the first processor according to the first clock frequency or the second processor according to the second clock frequency.

17. An apparatus comprising:
a first processor that accesses memory according to a first clock frequency;
a second processor that accesses memory according to a second clock frequency;
a memory device having shared memory banks that can be accessed by either the first or second processors, the shared memory banks configurable to selectively operate according to the first clock frequency or the second clock frequency; and
a memory controller to enable dynamic configuration of organization of the shared memory banks to allow a first set of shared memory banks to be accessed by the first processor according to the first timing scheme and a second set of the shared memory banks to be accessed by the second processor according to the second timing scheme, in which the memory controller comprises
a first clock domain requestor that operates according to the first clock frequency and passes memory access instructions from the first processor to the shared memory banks, and
a second clock domain requestor that operates according to the second clock frequency and passes memory access instructions from the second processor to the shared memory banks, and only one of the first and second clock domain requestors is granted access to any particular shared memory bank at a given time;
wherein when the first processor is granted access to a particular shared memory bank, and the second processor seeks access to the particular shared memory bank, the second clock domain requestor sends an arbitration request signal to the first clock domain requestor, and the first clock domain requestor sends an arbitration grant signal to the second clock domain requestor after the first clock domain requestor determines that memory access requests from the first processor to the particular shared memory bank have been completed.

18. The apparatus of claim 17 in which the memory controller comprises one or more synchronization units that synchronize the arbitration request signal and arbitration grant signal across different clock domains.

19. A method comprising:
dynamically configuring organization of a memory device to allow a first portion of the memory device to be accessed by a first processor according to a first timing scheme and a second portion of the memory device to be accessed by a second processor according to a second timing scheme;
receiving, at a first clock domain requestor in a memory controller, a first memory access instruction from the first processor, the first clock domain requestor operating according to a first clock frequency of the first timing scheme;
sending the first memory access instruction from the first clock domain requestor to the memory device to enable the first processor to access the first portion of the memory device responsive to the first memory access instruction according to the first timing scheme;
receiving, at a second clock domain requestor in the memory controller, a second memory access instruction from the second processor, the second clock domain requestor operating according to a second clock frequency of the second timing scheme;
sending the second memory access instruction from the second clock domain requestor to the memory device to enable the second processor to access the second portion of the memory device responsive to the second memory access instruction according to the second timing scheme;
after access to a particular shared memory bank is granted to the first processor, sending an arbitration request signal from the second clock domain requestor to the first clock domain requestor, and sending an arbitration grant signal from the first clock domain requestor to the second clock domain requestor after the first clock domain requestor determines that memory access requests from the first processor to the particular shared memory bank have been completed; and
granting only one of the first and second clock domain requestors access to any particular shared memory bank in the memory device at a given time.

20. The method of claim 19 in which accessing the first portion of the memory device according to the first timing scheme comprises accessing the first portion of the memory device according to the first clock frequency, and accessing the second portion of the memory device according to the second timing scheme comprises accessing the second portion of the memory device according to the second clock frequency.

21. The method of claim 20, comprising, for each memory bank in the memory device, selecting one of a first clock signal having the first clock frequency and a second clock signal having the second clock frequency, and passing the selected clock signal to the memory bank.

22. The method of claim 19, comprising re-configuring the organization of the memory device to adjust the sizes of the first and second portions while executing an application program by the first processor.

23. The method of claim 19, comprising re-configuring the organization of the memory device to adjust the sizes of the first and second portions upon start-up of the memory device and the memory controller.

24. The method of claim 19, comprising allocating the first and second portions of the memory device along boundaries of memory banks of the memory device.

25. The method of claim 19, comprising re-configuring the memory device to re-allocate the sizes of the first and second portions of the memory device using five or less clock cycles according to the slower of the first and second clock frequencies.

26. The method of claim 19, comprising accessing the first portion of the memory device using a first bus width, and accessing the second portion of the memory device using a second bus width.

27. The method of claim 19 in which the memory controller monitors execution of memory access instructions, and upon receiving a signal to switch from a first memory access timing scheme to a second memory access timing scheme, determines whether memory access instructions associated with the first memory access timing scheme have been completed before switching to the second memory access timing scheme.

28. A method comprising:
dynamically configuring organization of a memory device having shared memory banks that are shared between a first processor and a second processor to allow a first set of the shared memory banks to be accessed by the first processor according to a first clock frequency and a second set of the shared memory banks to be accessed by the second processor according to a second clock frequency;
arbitrating, at a memory controller that includes a first clock domain requestor and a second clock domain requestor, requests for accessing the shared memory banks by the first and second processors, the requests from the first processor being synchronized according to the first clock frequency and the requests from the second processor being synchronized according to the second clock frequency; and
granting access to a particular shared memory bank to the first processor until the second processor requests access to the particular shared memory bank, and performing an arbitration handshake to determine whether the second processor is granted access to the particular shared memory bank,
wherein performing the arbitration handshake comprises sending an arbitration request signal from the second clock domain requestor to the first clock domain requestor, and sending an arbitration grant signal from the first clock domain requestor to the second clock domain requestor after the first clock domain requestor determines that memory access requests from the first processor to the particular shared memory bank have been completed.

29. The method of claim 28, comprising granting access to the particular shared memory bank to the second processor until the first processor requests access to the particular shared memory bank, sending an arbitration request signal from the first clock domain requestor to the second clock domain requestor, and sending an arbitration grant signal from the second clock domain requestor to the first clock domain requestor after the second clock domain requestor determines that memory access requests from the second processor to the particular shared memory bank have been completed.

30. The method of claim 28, comprising synchronizing the arbitration request signal and the arbitration grant signal across different clock domains.

31. An apparatus comprising:
a memory device having a plurality of portions each configurable to operate according to multiple timing schemes; and
means for enabling dynamic configuration of organization of the memory device to allow each portion of the memory device to be dynamically configured to be accessed according to a first timing scheme or a second timing scheme while executing an application program,
wherein the dynamic configuration enabling means comprises a memory controller that includes a first clock domain requestor that operates according to a first clock frequency of one of the multiple timing schemes and passes memory access instructions from a first processor to the shared memory banks, and
a second clock domain requestor that operates according to a second clock frequency of another one of the multiple timing schemes and passes memory access instructions from a second processor to the shared memory banks, in which only one of the first and second clock domain requestors is granted access to any particular shared memory bank at a given time;
wherein the memory controller is configured such that after access to a particular shared memory bank is granted to the first processor, the second clock domain requestor sends an arbitration request signal to the first clock domain requestor, and the first clock domain requestor sends an arbitration grant signal to the second clock domain requestor after the first clock domain requestor determines that memory access requests from the first processor to the particular shared memory bank have been completed.

32. The apparatus of claim 1 in which the memory controller is configured such that after access to the particular shared memory bank is granted to the second processor, when the first processor requests access to the particular shared memory bank, the first clock domain requestor sends an arbitration request signal to the second clock domain requestor, and the second clock domain requestor sends an arbitration grant signal to the first clock domain requestor after the second clock domain requestor determines that memory access requests from the second processor to the particular shared memory bank have been completed.

33. The apparatus of claim 17 in which the memory controller is configured such that after access to the particular shared memory bank is granted to the second processor, when the first processor requests access to the particular shared memory bank, the first clock domain requestor sends an arbitration request signal to the second clock domain requestor, and the second clock domain requestor sends an arbitration grant signal to the first clock domain requestor after the second clock domain requestor determines that memory access requests from the second processor to the particular shared memory bank have been completed.

34. The method of claim 19, comprising after access to the particular shared memory bank is granted to the second processor, sending an arbitration request signal from the first clock domain requestor to the second clock domain requestor, and sending an arbitration grant signal from the second clock domain requestor to the first clock domain requestor after the second clock domain requestor determines that memory access requests from the second processor to the particular shared memory bank have been completed.

35. The apparatus of claim 31 in which the memory controller is configured such that after access to the particular shared memory bank is granted to the second processor, when the first processor requests access to the particular shared memory bank, the first clock domain requestor sends an arbitration request signal to the second clock domain requestor, and the second clock domain requestor sends an arbitration grant signal to the first clock domain requestor after the second clock domain requestor determines that memory access requests from the second processor to the particular shared memory bank have been completed.

* * * * *

UNITED STATES PATENT AND TRADEMARK OFFICE
CERTIFICATE OF CORRECTION

PATENT NO. : 8,296,526 B2  Page 1 of 1
APPLICATION NO. : 12/486308
DATED : October 23, 2012
INVENTOR(S) : Kari Ann O'Brien et al.

It is certified that error appears in the above-identified patent and that said Letters Patent is hereby corrected as shown below:

On the title page, item (75) Inventors: line 3, delete "Joern Soersensen," and insert
-- Joern Soerensen, --.

Col. 9, line 62, delete "L2 memory banks 110" and insert -- L2 memory banks 112 --.

Col. 9, line 63, delete "L2 memory banks 110" and insert -- L2 memory banks 112 --.

Signed and Sealed this
Twenty-second Day of January, 2013

David J. Kappos
*Director of the United States Patent and Trademark Office*